United States Patent
Bornefalk et al.

(10) Patent No.: US 8,378,310 B2
(45) Date of Patent: Feb. 19, 2013

(54) IMAGE QUALITY IN PHOTON COUNTING-MODE DETECTOR SYSTEMS

(75) Inventors: Hans Bornefalk, Uppsala (SE); Mats Danielsson, Täby (SE); Christer Svensson, Motala (SE)

(73) Assignee: Prismatic Sensors AB, Taby (SE)

( * ) Notice: Subject to any disclaimer, the term of this patent is extended or adjusted under 35 U.S.C. 154(b) by 529 days.

(21) Appl. No.: 12/707,076

(22) Filed: Feb. 17, 2010

(65) Prior Publication Data

US 2010/0215230 A1 Aug. 26, 2010

Related U.S. Application Data

(63) Continuation-in-part of application No. 12/488,930, filed on Jun. 22, 2009, now Pat. No. 8,183,535.

(60) Provisional application No. 61/151,637, filed on Feb. 11, 2009.

(51) Int. Cl.
*G01T 1/24* (2006.01)
(52) U.S. Cl. .............................. 250/370.09; 250/370.01
(58) Field of Classification Search .................. 250/369, 250/370.01, 370.09
See application file for complete search history.

(56) References Cited

U.S. PATENT DOCUMENTS

| | | | |
|---|---|---|---|
| 5,434,417 A | 7/1995 | Nygren | |
| 5,821,540 A | 10/1998 | Sato et al. | |
| 2002/0017609 A1 | 2/2002 | Danielsson | |
| 2002/0018543 A1 | 2/2002 | Danielsson | |

FOREIGN PATENT DOCUMENTS

| | | |
|---|---|---|
| DE | 4025427 | 2/1992 |
| DE | 19618465 | 8/1997 |
| WO | WO 0068710 A2 | 11/2000 |

OTHER PUBLICATIONS

International Search Report and Written of the International Searching Authority mailed Apr. 14, 2010 in corresponding Application No. PCT/SE2010/050106.
Beuville, E. et al., "High Resolution X-ray Imaging Using a Silicon Strip Detector", IEEE transactions on Nuclear Science, vol. 45, No. 6, Dec. 1998, p. 3059-3063.
U.S. Appl. No. 12/488,930, filed Jun. 22, 2009; Inventor: Danielsson et al.
P. Shikhaliev, *Projection X-ray Imaging with Photon Energy Weighting: Experimental Evaluation with a Prototype Detector*, Phys. Med. Biol. 54 (2009), pp. 4971-4992.
R. Alvarez et al., *Energy-Selective Reconstructions in X-ray Computerized Tomography*, Phys. Med. Biol., 1976, vol. 21, No. 5, pp. 733-744.
W. Barber et al., *Characterization of a Novel Photon Counting Detector for Clinical CT: Count Rate, Energy Resolution, and Noise Performance*, Medical Imaging 2009: Physics of Medical Imaging.

(Continued)

*Primary Examiner* — Mark R Gaworecki
(74) *Attorney, Agent, or Firm* — Nixon & Vanderhye P.C.

(57) ABSTRACT

The current invention applies to photon counting silicon x-ray detectors with energy discriminating capabilities and applications in x-ray imaging systems. The overall image quality produced by such a system is improved by the presented novel methods for optimally using the energy information in Compton events and making selective use of counts induced from charges collected in neighboring pixels. The pile-up problem during high-flux imaging regimes is reduced by a novel method for signal reset, which improves the count efficiency by reducing the risk of losing event due to signal pile-up in the read out electronics chain.

25 Claims, 12 Drawing Sheets

OTHER PUBLICATIONS

M. Brigida et al., *A New Monte Carlo Code for Full Simulation of Silicon Strip Detectors*, Nuclear Instruments and Methods in Physics Research A 533 (2004), pp. 322-343.

R. Cahn et al., *Detective Quantum Efficiency Dependence on X-ray Energy Weighting in Mammography*, Medical Physics, vol. 26, No. 12, Dec. 1999, pp. 2680-2683.

R. Nowotny, *Application of Si-Microstrip-Detectors in Medicine and Structural Analysis*, Nuclear Instruments and Methods in Physics Research 226 (1984), North-Holland, Amsterdam, pp. 34-39.

J.P. Schlomka et al., *Experimental Feasibility of Multi-Energy Photon-Counting K-Edge Imaging in Pre-Clinical Computed Tomography*, Phys. Med. Biol. 53 (2008), pp. 4031-4047.

T. Schmidt, *Optimal "Image-Based" Weighting for Energy-Resolved CT*, Medical Physics, vol. 36, No. 7, Jul. 2009, pp. 3018-3027.

IMAGE QUALITY IN PHOTON COUNTING-MODE DETECTOR SYSTEMS

CROSS-REFERENCE TO RELATED APPLICATION(S)

The present application is a continuation-in-part of U.S. Ser. No. 12/488,930, filed Jun. 22, 2009, which claims priority from U.S. 61/151,637, filed Feb. 11, 2009, the disclosures of which are incorporated herein.

TECHNICAL FIELD

The present invention relates to x-ray imaging and more specifically to photon counting x-ray imaging.

BACKGROUND

Theoretical consideration have shown that ideal photon-counting energy-sensitive detectors applying optimal energy weighting schemes have the potential to increase contrast-to-noise ratio in radiographic images (x-ray radiography and computed tomography) with 20-60% compared to energy integrating systems at the same patient close: Cahn et al, "Detective quantum efficiency dependence on x-ray energy weighting in mammography," Medical Physics 26:2680-2683 (1999); Shikhaliev, "Projection x-ray imaging with photon energy weighting: experimental evaluation with a prototype detector," Physics in Medicine and Biology 54:4971-4992 (2009); and Schmidt, "Optimal 'image-based' weighting for energy-resolved CT", Medical Physics 36(7): 3018-3027 (2009).

The use of spectral information, i.e. assessment about the energy of separate x-ray quanta, also opens up for other spectral medical imaging applications such as quantification of tissue composition: Alvarez and Macovski, "Energy-selective reconstruction in x-ray computerized tomography" Phys. Med. Biol. 21 733-44, (1976)) and k-edge imaging: J-P Schlomka, E Roessl et al. "Experimental feasibility of multi-energy photon-counting K-edge imaging in pre-clinical computed tomography," Physics in Medicine and Biology 53(15): 4031-4047 (2008). The use of spectral information also allow for unproved non-destructive testing outside the realm of medical imaging (security scans) where knowledge of the composition of an unknown material is valuable.

Two main types of direct conversion semi-conductor materials have been proposed for photon counting-mode computer tomography applications: Cadmium Telluride/Cadmium Zink Telluride (CdTe/CZT) and silicon strip detectors (Nowotny, "Application of Si-microstrip-detectors in medicine and structural analysis," Nuclear instruments and methods in Physics research 226 (1984) pp. 34-39.

The high x-ray flux in a clinical CT examination, up to 1000 Mcps/mm$^2$ on the detector, puts extreme demands on detector read-out electronics and any remaining pile-up will degrade the energy resolution and counting efficiency of the detector and thereby a large fraction of the attainable improvements compared to energy integrating systems. CZT has been shown to suffer from this already at flux rates 100 times lower than those encountered in clinical practice: Barber et al "Characterization of a novel photon counting detector for clinical CT; count rate, energy resolution, and noise performance," Physics of Medical Imaging, in Proc. of SPIE, vol. 7258 (2009).

The above so called flux rate problem can be simply illustrated: A photon converting in the middle of a 3 mm thick CdTe or CZT detector pixel the induced current pulse will extend 40-45 ns in time. At a count rate of 1000 MHz on the 1 mm$^2$ pixel the average time separation between the pulses will be 1 ns and this explains why pulses will overlap (a phenomenon referred to as signal pile-up) in CdTe detectors already at flux rates well below those encountered in clinical practice.

Silicon as an x-ray detector material has shorter collection times of induced charge carriers (duration of induced currents); for a typical 0.5 mm detector wafer thickness, the collection time is in the order of 8 ns. Silicon is thus less prone to intrinsic pile-up of signals at high flux rates. A smaller pixel size and depth segmentation, particularly with exponentially increasing thicknesses as described in the cross-referenced patent applications U.S. Ser. No. 12/488,930 Jun. 22, 2009 and U.S. 61/151,637 (Provisional) Feb. 11, 2009, further mitigates the problem of signal pile-up.

On the other hand Silicon, when compared to CdTe/CZT, suffers from a relatively low atomic number making it a worse photoelectric absorber. When an x-ray quantum deposits energy by means of the photoelectric effect in a direct conversion detector, to a good approximation all photon energy will be converted to electron hole pairs. In silicon detectors operated at high x-ray energies (>57 keV average photon energy) the Compton effect replaces the photoelectric effect as the dominant type of interaction. For Compton interactions, the deposited energy will depend on the x-ray deflection angle which in turn can only be determined in a statistical fashion using the well-known relationship Klein and Nishina established in 1929. The high fraction of Compton interactions deteriorates the energy resolution; i.e. making it impossible to deduct the original x-ray quantum energy by measuring the deposited energy.

Another benefit of photon counting detector systems is the ability to remove the detrimental effect of electronic noise by applying a low noise rejection threshold. For CdTe/CZT detector systems using typical x-ray spectra with energies ranging from 50 kilo electron volts (keV) to 140 keV, it is highly unlikely that primary quanta will deposit energies below 10 keV. Such a system can therefore apply a relatively high lower threshold around 10-20 keV to reject electronic noise, without the risk of loosing a high fraction of primary x-ray signals.

Due to the above mentioned high fraction of Compton interactions in a silicon detector used at high x-ray energies, many primary x-ray quanta will deposit energy below 20 keV. Applying such a high noise rejection threshold would be severely detrimental to the image quality of such a system since a high fraction of counts from primary x-rays having undergone Compton interaction will be discarded. The noise rejection threshold will therefore need to be set lower.

For very low energy bins, with deposited energy in the order of 0.5-2 keV electronic noise will be the dominant source of false counts in a silicon detector system. Due to Compton scattering in a silicon detector, many primary events depositing low energy will be lost if counts in such low energy bins are simply discarded. For somewhat higher energy bins (with detected energies in the range 2-5 keV), the dominant source of counts pertaining to non-primary events will be signals induced by charges being collected in neighboring pixels or charge shared events. This latter type of noise counts can potentially be removed by application of anti-coincidence logic, but the high flux makes the appropriate coincidence time window short. Including such noise counts high spatial correlation in the image reconstruction will lead to reduced spatial resolution.

The time between primary x-ray quanta reaching the detector after passage through an object will be exponentially distributed with an expected value corresponding to the 1/(flux rate). Pile-up is therefore not a binary phenomenon, i.e. occurring or not occurring. Even if great care is taken to reduce pixel count rate (by means of using smaller pixels and possibly layer the pixel in the direction of the incoming primary x-ray quantum) some pile-up will inevitably occur since there will always be a positive probability for two induced current pulses to overlap. The problem is aggravated by the readout electronics where pulses are integrated over time resulting in signals shapes appreciably longer than the charge collection time in the semi-conductor material itself. This increases the risk of pile-up.

There is thus a need to improve the performance of photon counting imaging systems, with respect to matters such as; loss of energy information for events where deposited energy varies substantially, but in a statistically known fashion, from actual x-ray quantum energy (for instance Compton scattering of k-edge fluorescence in the detector), the detrimental effect on pile-up introduced by the readout electronics and finally the problem of noise counts in the low energy bins.

SUMMARY

The invention overcomes these and other drawbacks of the prior art arrangements.

It is a general object to improve the performance of photon counting spectral imaging.

In a first aspect, it is a specific object to extract maximal amount of energy information from Compton events for x-ray spectral imaging applications.

In a second aspect, it is a specific object to effectively handle the effect of signal pile-up on the photo peak energy resolution and overall count efficiency of a photon counting detector.

In a third aspect, it is a specific object to improve image reconstruction based on energy information from a photon counting detector.

These and other objects are met by the invention as defined by the accompanying patent claims.

According to the first aspect, there is provided a method and apparatus for extracting energy information from Compton events in a photon counting detector. The events are allocated according to their detected energy based on a plurality of energy thresholds, wherein the thresholds define a plurality of energy bins, and each energy bin has an associated energy bin function. The detector response function of the photon counting detector is inverted, and the energy bin functions are integrated with the inverted detector response function to obtain a distribution of original x-ray quantum energies of events detected in each energy bin. This will significantly improve extraction of useful energy information from the detector system, and the spectral imaging framework may be adapted accordingly.

According to the second aspect, there is provided a method and apparatus for resetting a shaper filter output in order to increase the count efficiency and energy resolution of a photon counting detector. A basic idea is to reset the shaper filter output and internal signal nodes at a certain time $t_1$ after the shaper filter output amplitude has reached a threshold Thr1 and keep them reset until time $t_2 > t_1$. In this way, efficient detection of a small signal pulse arriving shortly after a large signal pulse may be ensured.

According to a third aspect, there is provided a method and apparatus for image reconstruction based on energy information from a photon counting detector. A basic idea is to provide two different image reconstruction modes:

i) a first image reconstruction mode in which low energy bins with a high fraction of noise counts are included in the image reconstruction; and ii) a second image reconstruction mode in which low energy bins with a high fraction of noise counts are excluded in the image reconstruction.

The source of said noise counts can either be counts induced from charges collected in neighboring pixels of the detector, charge shared events or electronic noise. Since there is a high number of primary counts in said low energy bins, this enables selection between the image reconstruction modes, e.g. in dependence on the imaging task. Each reconstruction mode may offer special advantages, e.g. improved signal-to-noise-ratio, and improved spatial resolution, respectively.

Other advantages will be appreciated when reading the below detailed description of exemplary embodiments.

BRIEF DESCRIPTION OF THE DRAWINGS

The invention may be better understood, and further advantages and uses thereof more readily apparent, when considered in view of the following detailed description of exemplary embodiments, taken with the accompanying diagrams, in which.

Figure 1:
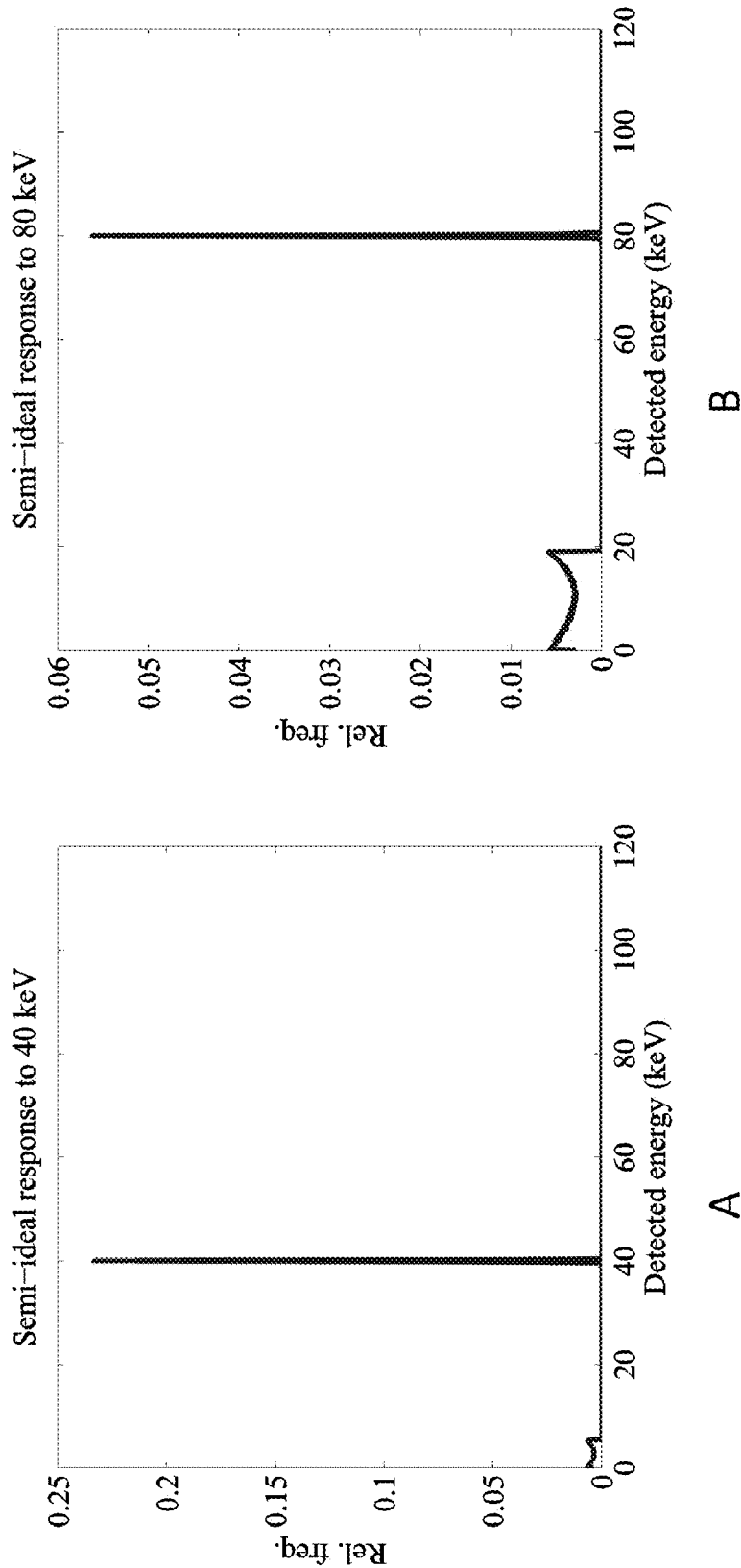
FIG. 1, panels a) and b) depict the semi-ideal detector response to 40 keV and 80 keV photons.

While the patent invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DETAILED DESCRIPTION

It may be useful to begin with a brief overview of the prior art. Several methods have been proposed to come to terms with the flux rate problem in photon counting radiography, including computer tomography. These include but are not limited to:

Segmenting the active detector depth into several layers to decrease count rate (U.S. Pat. No. 5,434,417 David Nygren, 1995 and Buchinsky, Multiple layer detector for spectral computed tomography imaging, US Patent Application US 2008/0315106 A1).

Introduction of drift structures to reduce the time duration of the induced current pulse (Iwanczyk et al, "Pixelated cadmium zink telluride based photon counting mode detector", US 2005/0139757 A1)

Introduction of a multitude of detector layers where the signal from one layer is used to statistically correct the measured count rate in other layers (Tkaczyk et al, Photon counting x-ray detector with overrange logic control", US Patent Application US 2007/0206721 A1).

Statistical methods for pile-up correction (Balan, Method for resolving ambiguity in photon counting-based detectors, US Patent Application US 2007/0262251 A1, Carmi, Method and apparatus for spectral computed tomography, US Patent Application US 2008/0260094 A1).

Sub-pixelation of the surface area of the pixel orthogonal to the x-ray direction (Proksa et al., Energy-resolved photon counting for CT, US Patent Application 2008/0205585 A1).

Except U.S. Pat. No. 5,434,417 (Nygren) all these methods pertain to CdTe or CZT detectors, which, as mentioned above have some important different physical characteristics: CdTe or CZT have a low charge carrier mobility mobility with a resulting high intrinsic susceptibility to signal pile-up at flux rates encountered in practice. Furthermore, the fraction of original x-ray quanta that convert to produce signals predominantly do this by means of the photo electric effect. This means that the discrepancy between deposited energy and original primary x-ray energy is not as large as for silicon-based detector systems, and consequently there is no need to statistically recoup energy information from Compton events.

One method has been proposed for overcoming the problem of long signal durations after the shaping filter by the use of a reset mechanism (U.S. Pat. No. 6,573,762). Long signal durations add to the problem of signal pile-up and overall count efficiency. A few important differences include at least one of the following:

A peak detector is used; we sample the signal shortly after a threshold has been reached No pile-up circuitry if similar construction is used (for instance no peak detector is applied)

No bias ladder circuitry is applied; instead we use a current and resistance controlled digital-analog-converter.

We typically use a higher number of comparators (e.g. eight)

A constant reference dc voltage level is used in the amplifier; our proposed invention does not Another prior art that might be worth mentioning is described in Hoffmann et al, US 2006/0056576 A1, also U.S. Pat. No. 7,149,278 B$^2$). There the time duration of the electronic filter is allowed to vary dynamically with the x-ray flux, which allows reduction of the pile-up problem.

US20090268862, "Energy Distribution Reconstruction In CT", suggests the use of a maximum likelihood method to infer the original photon energy of detected events. The reconstruction of the energy distribution is performed on the basis of a statistical analysis of the detection data, not on the basis of a simulated of carefully measured detector response function which is inverted and integrated with the bin functions.

In a first aspect, there is provided a method for extracting energy information from Compton events in a photon counting detector. Basically, the method includes the following steps. The first step (S1) involves allocating events according to their detected energy based on a plurality of energy thresholds. The thresholds define a plurality of energy bins, and each energy bin has an associated energy bin function. The next step (S2) involves inverting the detector response function of the photon counting detector. The third step (S3) involves integrating energy bin functions with the inverted detector response function to obtain a distribution of original x-ray quantum energies of events detected in each energy bin.

This will significantly improve extraction of useful energy information from the detector system, and the spectral imaging framework may be adapted accordingly.

A corresponding apparatus for extracting energy information from Compton events in a photon counting detector is basically configured to allocate events according to their detected energy based on a plurality of energy thresholds, to invert the detector response function of the photon counting detector, and to integrate energy bin functions with the inverted detector response function to obtain a distribution of original x-ray quantum energies of events detected in each energy bin.

The detector may for example be used in medical imaging applications, or non-destructive testing.

The detector energy response function may be mathematically simulated, or estimated/measured using monochromatic x-rays.

Preferably, although not necessarily, the photon counting detector is a silicon detector.

In a second aspect, there is provided a method for resetting a shaper filter output in order to increase the count efficiency and energy resolution of a photon counting detector. The shaper filter is normally part of the read-out electronics of the detector system. The method is based on resetting the shaper filter output and internal signal nodes to zero at a certain time $t_1$ after the shaper filter output amplitude has reached a threshold Thr1 and keeping them reset to zero until time $t_2 > t_1$.

This means that efficient detection of a small signal pulse arriving shortly after a large signal pulse can be ensured.

A corresponding apparatus for resetting a shaper filter output is configured to reset the shaper filter output and internal signal nodes of the shaper filter at a certain time t1 after the shaper filter output amplitude has reached a threshold Thr1 and keep them reset until time $t_2 > t_1$.

A plurality of thresholds and times $t_1$ and $t_2$ will yield satisfactory improvement in count efficiency. When the signal pulse increases, the different threshold levels; Thr1 ($T_1$), Thr2 ($T_2$), Thr3 ($T_3$), . . . for thresholds 1, 2, 3, . . . ; will be reached at slightly different times, the lowest threshold being reached first followed by the second lowest etc. In a particular example, the time $t_1$ is a certain time after the shaper filter output amplitude has reached the highest and thus last threshold level being reached for the actual event. In yet another particular example, the time $t_1$ is a certain time after the shaper filter output amplitude has reached any threshold between the first and last threshold reached for the actual event.

It is also feasible to adjust the time $t_1$ and $t_2$ in dependence on the frequency of converted x-ray quanta in the detector segment.

In an exemplary embodiment, the threshold(s) is/are preferably generated by current and resistance controlled digital-to-analog converter(s).

The reset mechanism may e.g. be implemented on an application specific integrated circuit (ASIC).

In a third aspect, there is provided a method for image reconstruction based on energy information from a photon counting detector. The overall image reconstruction method includes a selection between two different image reconstruction modes: i) first image reconstruction mode in which low energy bins with a high fraction of noise counts are included in the image reconstruction; and ii) a second image reconstruction mode in which low energy bins with a high fraction of noise counts are excluded in the image reconstruction.

Said noise counts can be either the result of electronic noise, charge shared events or counts induced from charges being collected in neighboring pixels of the detector. Charge shared events and counts induced from charges being collected in neighboring pixels of the detector can potentially be removed by application of anti-coincidence logic. The high flux rate and electronic requirements might not make such a solution desirable. Removing such noise counts by means of thresholding on the signal amplitude will be at the cost of significantly decreasing the number of primary events detected. For some imaging tasks it will therefore be beneficial to keep the counts in such low energy bins and include them in the image reconstruction. For other imaging tasks, this will not be the case.

The definition of "low energy bins" can e.g. be made by the operator in charge of the imaging task or set automatically by the system. Anyway, the expression means bins where events depositing relatively low energies resulting in correspondingly relatively low pulse heights only reaching over the relatively low thresholds are detected.

This enables selection between the image reconstruction modes, e.g. in dependence on the imaging task. Each reconstruction mode may offer special advantages, e.g. improved signal-to-noise-ratio, and improved spatial resolution, respectively. The first image reconstruction mode may be selected for improved signal-to-noise-ratio, and the second image reconstruction mode may be selected for improved spatial resolution.

By way of example, for larger objects with small contrast, the inclusion of low energy bins will normally improve the signal-to-noise ratio of the image (image quality) at any given dose. For smaller objects with high contrast, it will normally be beneficial to exclude the information from these energy bins. This enables a trade-off between high spatial resolution and high contrast resolution, which is beneficial if target objects with different spatial frequency characteristics are imaged.

In an exemplary embodiment, the image reconstruction mode is selected for reconstruction of image details that demand high spatial resolution.

A corresponding apparatus for image reconstruction based on energy information from a photon counting detector is configured for operation based on the above two different image reconstruction modes.

The apparatus is generally configured to allow selection between the image reconstruction modes. This can be either a manual selection, which requires some operator input, or it can be an automatic selection. In the latter case, the apparatus may be configured to select between image reconstruction modes based on an automated analysis of the spatial frequency content of at least part of the image plane being reconstructed. Alternatively, the apparatus is configured to incorporate or integrate the selection of image reconstruction mode into the selection of imaging task on the imaging modality.

The functional blocks described above may be implemented in hardware using any conventional hardware technology such as Integrated Circuit (IC) technology. Alternatively, at least some of the functional blocks may be implemented in software for execution on suitable processing hardware such as a microprocessor or digital signal processor.

Figure 12:
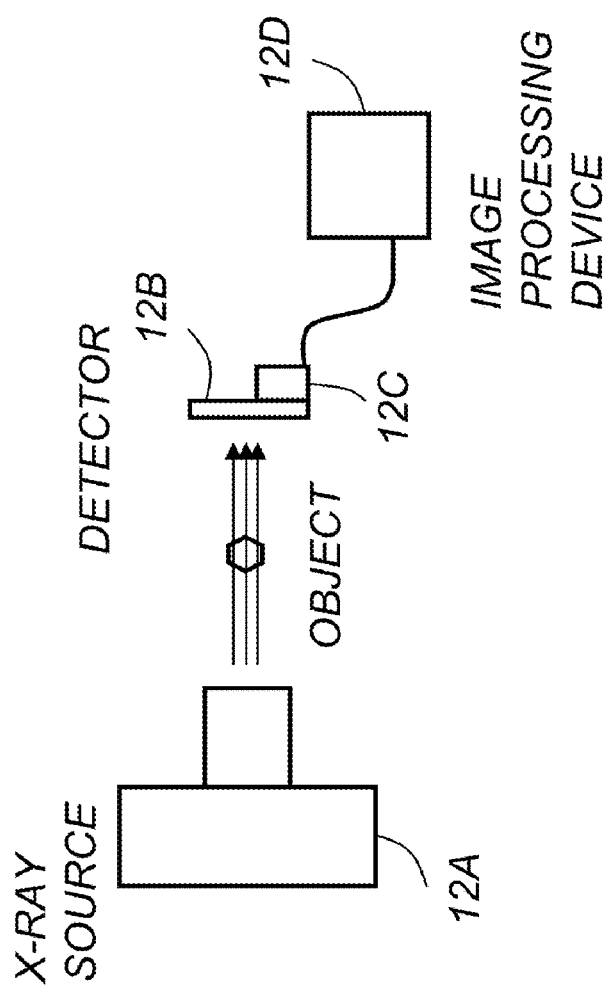
FIG. 12 is a schematic block diagram illustrating an example of an overall x-ray imaging system.

FIG. 12 is a schematic block diagram illustrating an example of an overall x-ray imaging system comprising an x-ray source 12A, an x-ray detector 12B, read-out electronics 12C connectable to an image processing device 12D. In general, the detector is configured for registering radiation from the x-ray source that may have been focused by x-ray optics and having passed an object or part of an object to be imaged. The detector is preferably connectable to the image processing device via suitable read-out electronics to obtain a useful image.

The novel extraction of appropriate energy information according to the first aspect may be implemented in the image processing device, or in a separate unit before the actual image processing device.

The novel reset mechanism according to the second aspect may be implemented together with the corresponding shaper amplifier in the read-out electronics.

The novel multi-mode image reconstruction mechanism according to the third aspect may be implemented in the image processing device.

Figure 13:
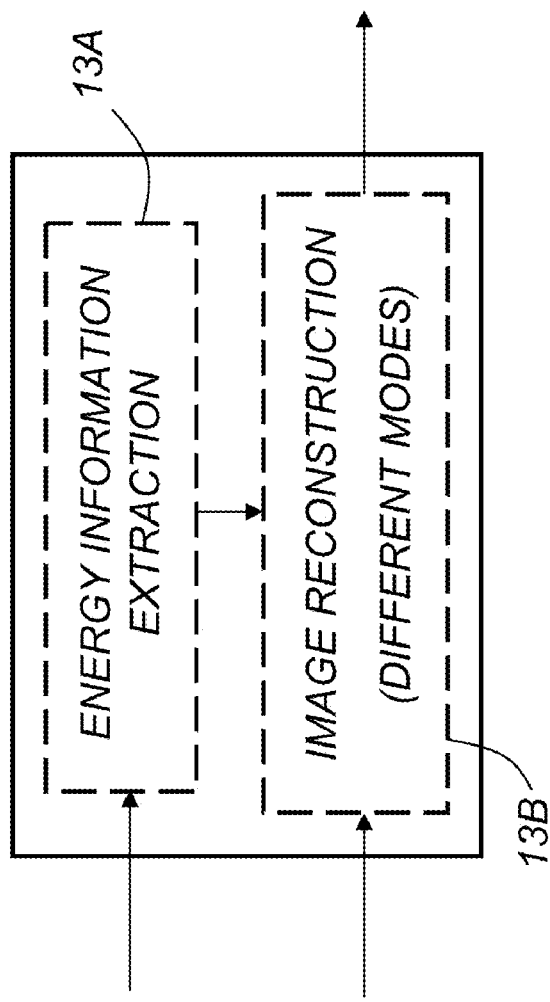
FIG. 13 is a schematic block diagram of an example of an image processing device.

FIG. 13 is a schematic block diagram of an example of an image processing device according to an exemplary embodiment. The image processing device includes an energy information extraction unit 13A and an image reconstruction unit 13B. In this particular example, information from the detector is transferred to the image processing device via the read-out electronics, and preferably taken care of by the energy information extraction unit 13A, which determines a distribution of original x-ray quantum energies of events detected in each energy bin based on the inverted detector response function. This information may then be used by the image reconstruction unit 13B, which may switch between the above-mentioned image reconstruction modes. Alternatively, or as a complement, energy information from the detector/read-out electronics may be directly transferred to the image reconstruction unit 13B.

The embodiments described above are to be understood as a few illustrative examples of the present invention. It will be understood by those skilled in the art that various modifications, combinations and changes may be made to the embodiments without departing from the scope of the present invention. In particular, each aspect of the invention may be utilized separately or in combination with one or more of the other aspects. In addition, different part solutions in the different embodiments can be combined in other configurations, where technically possible. The scope of the present invention is, however, defined by the appended claims.

For a better understanding, it may be useful with a more thorough mathematical description of exemplary embodiments, with references to the drawings.

Energy Information from Compton Events

Spectral information, i.e. using the knowledge of the energy of each separate x-ray photon detected, can be used to enhance the detectability of certain imaging tasks in two basic ways described below.

The first method is to apply an energy dependent weighting factor w(E) to each photon detected before constructing the projection image. For the case of a photon counting x-ray detection system the value in a projection image at location x', would be given as $$I(x')=I_0(x')\int_\Phi \Phi(E)D(E)w(E)e^{-\int_s \mu(x,y;E)ds}dE \qquad (1)$$

where $I_0(x')$ is the number of photons impingent on the target on the area projected onto x', $\Phi(E)$ is the x-ray spectrum on the target designed such that the fraction of x rays with energy in the interval (E, E+dE) is given by $\Phi(E)dE$, D(E) is the detection efficiency of the detector, $\mu(x, y; E)$ is the energy dependent linear attenuation coefficient and s is the x-ray path through the target object ending at x'. In order to maximize the signal-difference-to-noise ratio (SDNR) of a target structure with linear attenuation $\mu_t(E)$ over a background with linear attenuation $\mu_b(E)$, it has been shown that the optimal weight factor is given by $$w^*(E) = \frac{1-e^{(\mu_t(E)-\mu_b(E))d}}{1+e^{(\mu_t(E)-\mu_b(E))d}} \qquad (2)$$

where d is the (often unknown) thickness of the target structure. For high Z materials, where the photoelectric cross section dominates over the Compton cross section, this weight factor simplifies to the near optimal $w(E) \ E^{-3}$.

Pure photon counting systems apply w(E)=1 whereas energy integrating detectors have w(E)=kE with arbitrary k. Theoretical comparisons on the advantage in going from an energy integrating mode, w(E)=kE to photon counting mode and beyond (using optimal or near optimal weighting) have shown that for ideal detectors (D(E)≡1) the increase in SDNR is approximately 20-60% for energy weighting.

A real x-ray system naturally does not exhibit infinite energy resolution as in (1). Instead the readout electronics apply a series of energy thresholds distributing the counts in N energy bins $B_i$ defined by N energy thresholds $T_i$, i=1, ..., N, such that events with energy E are placed in bin $B_i$ if $T_i \leq E < T_{i+1}$. $T_{N+1}$ is generally assumed to be infinity, but can be set lower to discard piled up events. Now define a bin function $S_i$ using the Heaviside step function $\chi(x)$, being 1 for $x \geq 0$ and zero otherwise:

$$S_i(E)=\chi(E-T_i)-\chi(E-T_{i+1}). \qquad (3)$$

Equation (1) is now adopted to allow for energy bins:

$$I(x';B_i)=I_0(x')\int_\Phi \Phi(E)S_i(E)D(E)e^{-\int_s \mu(x,y;E)ds}dE. \qquad (4)$$

$I(x'; B_i)$ is the expected number of counts in the i:th bin and the total projection image (in terms of expected pixel values) is given by $$I(x') = \sum_{i=1}^{N} I(x'; B_i)\overline{w}(E_i), \qquad (5)$$

where $\overline{w}(E_i)$ is the average value of the weight factor over the bin:

$$\overline{w}(E_i) = \frac{\int_\Phi \Phi(E)S_i(E)w(E)dE}{\int_\Phi \Phi(E)S_i(E)dE}. \qquad (6)$$

The second method to use spectral information is the decomposition method originally proposed by Alvarez and Macovski 1976. This method, whereby the energy dependent linear attenuation coefficient $\mu$ is decomposed into two components capturing the energy dependence of the photoelectric effect (subscript ph) and incoherent, or Compton, scattering (subscript Co), has later on been adapted to allow for components exhibiting a clear k-edge in the energy interval (subscript k). This allows decomposition into three (or more) basis images as shown below (prior to reconstruction for the case that the applied x-ray imaging system is used to construct tomographic images).

The method starts by decomposing the unknown attenuation coefficient into three (or more) bases with known energy dependencies:

$$\mu(x,y;E)=a_{ph}(x,y)f_{ph}(E)+a_{Co}(x,y)f_{Co}(E)+a_k(x,y)f_k(E). \qquad (7)$$

The photoelectric cross section declines with E like $E^{-3}$ why $f_{ph}=E^{-3}$ is normally assumed. For the Compton part, $f_{Co}$ is usually the Klein-Nishina cross section which explains the normalization with the electron rest mass $E_e$=511 keV normally encountered. For $f_k(E)$, the total attenuation coefficient for gadolinium (including photoelectric effect, Compton and Rayleigh scattering) is used. For illustrative purposes, all improvements with the proposed method are estimated using values of attenuation coefficients downloaded from the XCOM database.

Using (7), the exponent $\int_s \mu(x, y; E)ds$ in (4) can be written as $\Sigma_\alpha A_\alpha(x')f_\alpha(E)$ with $A_\alpha(x')=\int_s a_\alpha(x,y)ds$ for $\alpha \in \{ph, Co, k\}$. The second and final step in the decomposition method is to use the registered counts $m_i(x')$ in each bin $B_i$ to determine the line integrals $A_\alpha(x')$ by solving the, generally overdetermined, system of integral equations for $A_\alpha(x')$:

$$m_i(x')=I_0(x')\int_\Phi \Phi(E)S_i(E)D(E)e^{-\Sigma_\alpha A_\alpha(x')f_\alpha(E)}dE,$$
$$i=1, \ldots, N. \qquad (8)$$

Equations (7) and (8) are the basis for k-edge imaging. Roessl and Proska (2007) showed that this method is helpful in distinguishing between gadolinium contrast agent and plaque in coronary vessels, but as the technique is in its infancy one can expect more applications to follow.

Actual and Deposited Energies

It is important to already here distinguish between the actual x-ray photon energy and the corresponding energy deposited in the detector. With the use of a bin function as in (3), (8) implicitly assumes that these are the same; indeed the entire construction of (8) is based on actual photon energies and not deposited energies. This is a valid assumption for high Z materials, where the photoelectric effect dominates over Compton scattering, and in the absence of k-escape photons, charge sharing and pile-up. Under these conditions the deposited energy of a photon interacting in the detector, the probability of which is adequately captured by the detection efficiency D(E), will match its actual energy and (8) thus holds. For silicon detectors however, the Compton effect dominates over the photoelectric effect over 57 keV and the deposited energies of Compton scattered photons will differ greatly and stochastically from the actual photon energies. The counts in a low energy bin could therefore either be the result of a photoelectric interaction of a low-energy photon or the result of a Compton scattered high-energy photon. Although the projection image of (5) in the photon counting mode would still be correct, application of (5) for other choices of the weight factor w(E) will lead to errors, as will a straight forward implementation of (8). Careful modelling of the detector response function will allow recouping some of the energy information lost, since the actual photon energy can then be inferred (in a statistical sense) from the deposited energy.

We will illustrate that this method will result in increased image quality at a given dose. We also show that the method lends itself well to k-edge imaging. These illustrations are performed for a "semi-ideal" detector capturing the effect of Compton events in the detector but disregarding charge sharing, pile-up, k-escape (which is negligible for silicon) and electronic noise. This is merely an illustration and it should not be understood that the method does not work in the presence of other such noise sources degrading the energy resolution. If all effects are simulated, or their influence on the energy resolution measured for instance by a monochromatic beam, the resulting real response function can be used in a similar way to improve image quality as the "semi-ideal" response function used for illustrative purposes here.

Detection Efficiency

X rays are assumed to pass a dead layer of $t_d$=0.3 mm silicon oxide before entering the active part of the detector, which thus is assumed to have an effective depth of $t_a$=30−2×0.3 mm=29.4 mm. Let $\mu_d(E)$ denote the linear attenuation coefficient of silicon oxide (subscript d denoting dead layer). $\mu_d(E)$ includes the photoelectric effect as well as both coherent and incoherent scatter. Let $\mu_a$, subscript a for active, denote the linear attenuation of silicon (without coherent scattering since it does not deposit any energy in the detector). The detection efficiency is given as $$D(E) = e^{-\mu_d(E)t_d}(1 - e^{-\mu_a(E)t_a}). \tag{9}$$

Semi-Ideal Silicon Detector Response Function

In the energy range used in CT examinations, two types of interaction occur and the distribution of energies deposited ($E_{dep}$) from an x ray with actual energy $E_{act}$ can be written as a weighted sum of the energy distribution resulting from the photoelectric absorption (index ph) and Compton scattering (index Co):

$$f(E_{dep}|E_{act}) = p_{ph}(E_{act})f(E_{dep,ph}|E_{act}) + p_{Co}(E_{act})f(E_{dep,Co}|E_{act}). \tag{10}$$

$p_i(E_{act})$ and $f(E_{dep,i}|E_{act})$ for $i \in \{ph, Co\}$ are the probabilities for interaction for a photon of energy $E_{act}$ and the distribution of deposited energies.

In the construction of the detector response function it is assumed that an event always occurs and since the detection efficiency D(E) in (9) precludes coherent scattering in the active detector material, the probabilities $p_{ph}(E_{act})$ and $p_{Co}(E_{act})$ sum to unity for all energies and are given by:

$$p_i(E_{act}) = \frac{\sigma_i(E_{act})}{\sigma_{ph}(E_{act}) + \sigma_{Co}(E_{act})}, \ i \in \{ph, Co\} \tag{11}$$

where $\sigma$ is the cross section, also taken from the XCOM database.

$f(E_{dep,ph}|E_{act})$, the distribution of energies deposited by a photon interacting via photoelectric absorption, is in essence a discrete probability distribution with unit mass at $E_{act}$. The only uncertainty stems from the random effects in the hole-pair generation resulting in a minor spread of the deposited energies with a standard deviation given by $\sigma_{ph}(E_{act}) = \sqrt{F\epsilon E_{act}}$ where F is the Fano factor (0.11 for silicon) and $\epsilon$ is the electron-hole pair generation energy (3.6 eV for silicon). We therefore model the distribution of deposited energies as a Gaussian distribution with mean $E_{act}$ and standard deviation $\sigma_{ph}(E_{act})$.

For Compton scattering events there will however be a large uncertainty as to the deposited energy from an impingent photon of energy $E_{act}$. The energy deposited by a photon will be a function of the deflection angle which can be sampled from the Klein-Nishina differential cross-section (Klein and Nishina 1929) giving the angular distribution (assuming collision with free electrons):

$$\frac{d\sigma}{d\theta} \propto \left(1 + \cos^2\theta + \frac{k^2(1-\cos\theta)^2}{1+k(1-\cos\theta)}\right)(1+k(1-\cos\theta))^{-2}\sin\theta, \tag{12}$$

where k is the ratio of the photon energy $E_{act}$ and the electron mass energy at rest.

Given the deflection angle $\theta$, the deposited energy is given by $$E_{dep,Co}(\theta) | E_{act} = E_{act}\left(1 - \frac{1}{1+k(1-\cos\theta)}\right). \tag{13}$$

Note that this semi-ideal model does not account for secondary events in the detector which is a simplification only for illustrative purposes.

With (12) normalized such that $\int_{-\pi}^{\pi} f_\theta(x)dx = 1$ with $$\int_\theta(x) = \frac{d\sigma}{d\theta}\bigg|_{\theta=x},$$

the distribution of energies deposited from Compton events $f(E_{dep,Co}|E_{act})$ is given by noting that energy is deposited in the interval $(E_{dep,Co}(\theta), E_{dep,Co}(\theta+\delta\theta))$ with probability $\int_\theta^{\theta+\delta\theta} f_\theta(x)dx$. The response to two energies are shown in FIG. 1 where panels a) and b) depict the semi-ideal detector response to 40 keV and 80 keV photons, respectively. In particular, the sharp Compton edge at 5 keV for the response to 40 keV photons and at 20 keV for the 80 keV photons should be noted. From this figure it is clear that some energy information is contained in the Compton events, and the present invention recoups maximal amount of this information to improve image quality at any given dose, or, equivalently, reduce dose at any given image quality.

Figure 2:
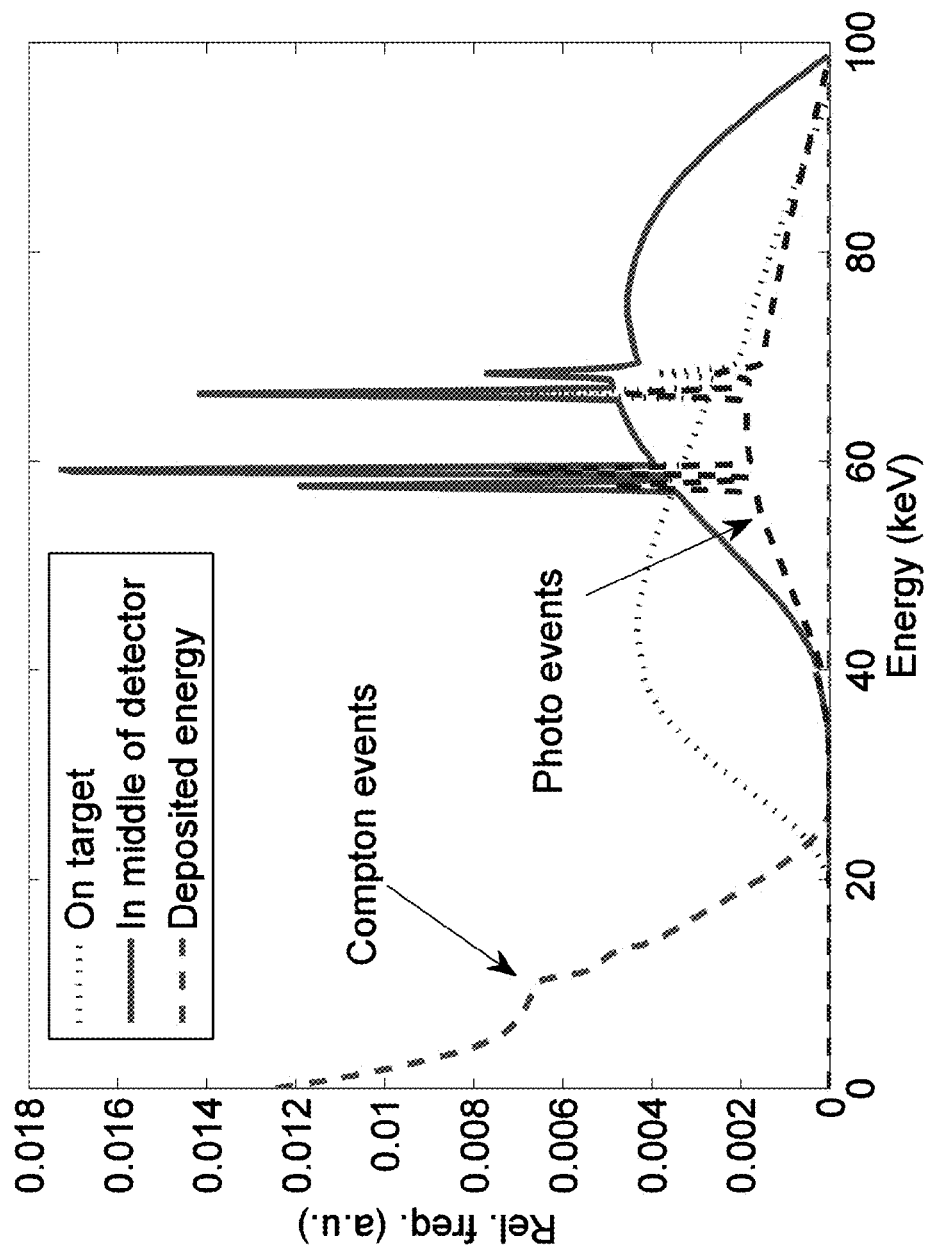
FIG. 2 depicts typical x-ray spectra.

FIG. 2 depicts typical x-ray spectra. The figure illustrates two fundamental characteristics; the first of which is the filtration of the incoming x-ray spectra through the object being examined and through part of the silicon detector. This leads to beam hardening which is illustrated by the shift to higher energies of the spectrum as seen by the middle of the detector vs the spectral shape seen by the target object being examined. The second effect is the separation of deposited energies pertaining to Compton interactions and photo electric events.

Adapting the Spectral Imaging Framework to Deposited Energies

Inversion of the Response Function $$g(E_{act}|E_{dep}) = f^{-1}(E_{dep}|E_{act}) \tag{14}$$

gives the probability distribution of the actual energy of an event that deposited $E_{dep}$. With $\tilde{S}_i$ being the distribution of actual energies that deposited energy in bin $S_i$, $$\tilde{S}_i = \int g(E_{act}|E_{dep})S_i dE_{dep} \tag{15}$$

simple substitution $S_i \to \tilde{S}_i$ in (4), (6) and (8) will adapt the spectral imaging frame-work to deposited energies, more apt for detector materials where deposited energies differ from actual photon energies.

Figure 3:
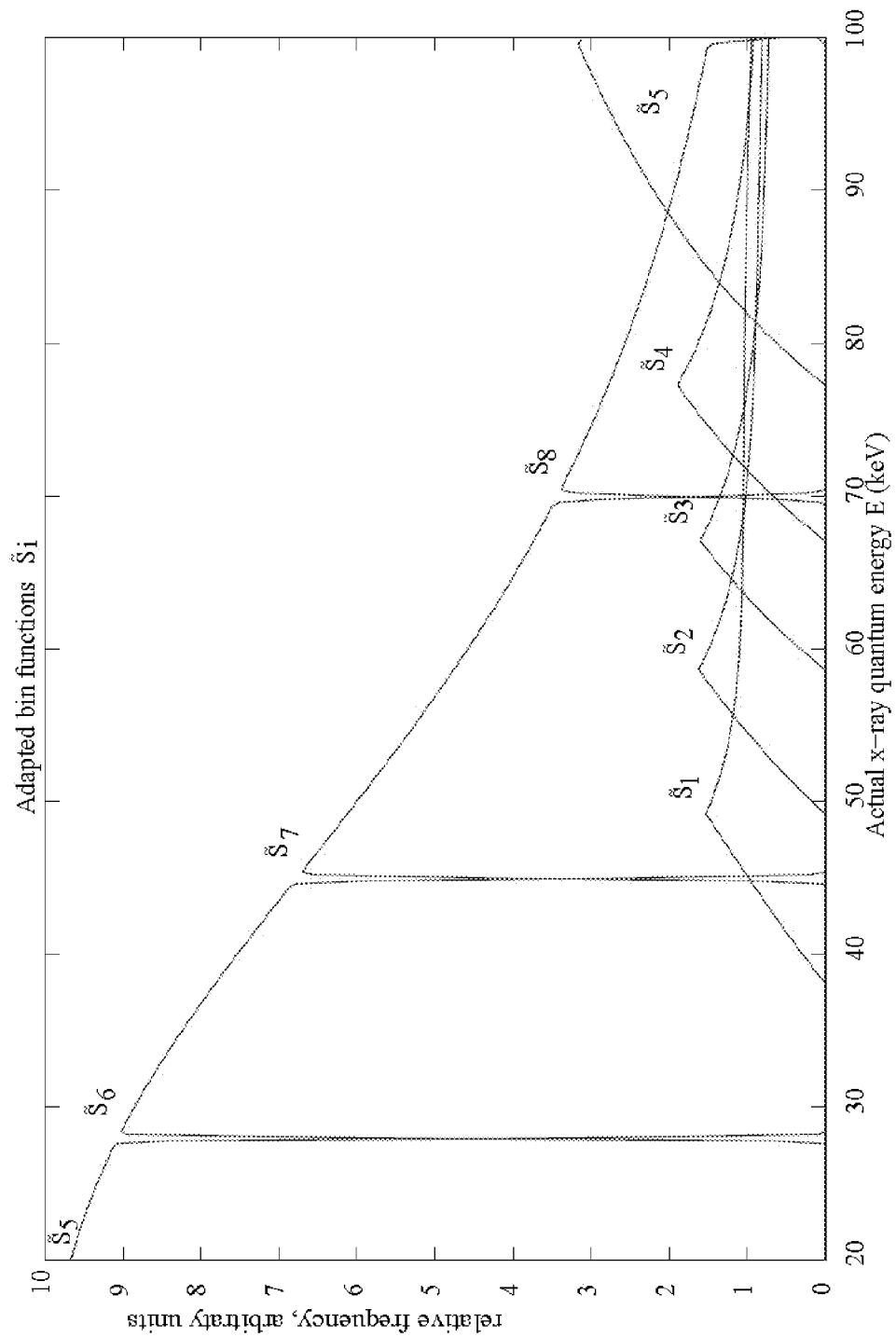
FIG. 3 depicts the inverted detector energy response function integrated with the bin functions, showing the distribution of original x-ray quantum energy for photon depositing energy in bin $B_i$.

FIG. 3 shows the adapted bin function $\tilde{S}_i$ for thresholds $T_1$=5, $T_2$=8, $T_3$=11, $T_4$=14, $T_5$=18, $T_6$=28, $T_7$=45, $T_8$=70 and $T_9=100$, i.e the inversion of the detector energy response function integrated over the bin functions. Each distribution denoted $\tilde{S}_i$, $=1, \ldots, n$ where n is the number of energy bins applied, gives the distribution of original x-ray quantum energy for photon depositing energy in bin $B_i$. For bins 1-4, a Compton edge is evident: for instance, no photon depositing energy in bin 4, i.e. deposited energy in the range $T_4 < E < T_5$ where $T_i$ is the energy threshold applied by the corresponding comparator, could have had an original photon energy less than 67 keV. Such information is enhance k-edge imaging applications, one of the objectives of the current invention. n is set to 8 in this particular embodiment, but this choice should not be perceived as a limitation as to the generality of the proposed method. Note that for all energy bins except $B_5$, it is clear what type of event resulted in detection: For counts in bin $B_1$, the events deposited between 5 and 8 keV. No primary photons of such low energy will hit the detector. Instead $\tilde{S}_1$ shows that the actual photon energies were almost evenly distributed between 50 and 100 keV and thus must have interacted by means of the Compton effect. For bins $B_6$-$B_8$; i.e. events depositing more than $T_6=28$ keV, it is clear that the interaction was by mean of the photoelectric effect and that there thus was no major discrepancy between actual and deposited energy. Finally, for a 100 kVp spectrum there is a small overlap of energies deposited by Compton scattering and photoelectric effect, and this is seen by the two separate parts of $\tilde{S}_5$.

Imaging Tasks

We model the background as a 30 cm thick, uniform volume of soft tissue with specific weight 0.95 embedded in which are four target objects: a 0.5 cm thick bone ($\rho=1.92$ g/cm³), a 1 cm thick volume of fat (adipose tissue, $\rho=0.95$ g/cm³), a 1 cm thick volume of water and 0.4 cm thick volume of 2% gadolinium (Roessl and Proksa 2007) and 98% blood ($\rho=1.06$ g/cm³). The lateral extent of the target objects are of no interest since simple pixel SDNRs are used for the comparison between an ideal energy integrating detector and the semi-ideal silicon detector system. MTFs thus do not enter the evaluation, which for imaging tasks involving small target objects would come into play, giving an added benefit to the system with smaller pixels. All x-ray attenuation coefficients are derived from XCOM and the composition and specific weights for soft tissue, cortical bone, fat and blood are all taken from NIST (ICRU-44).

Although simple in their construction, the imaging tasks do have clinical relevance. The bone target can thus be thought of as capturing the high contrast clinical tasks whereas the fat and water image are representative of low contrast imaging tasks of the abdomen and the gadolinium target is of course selected to illustrate k-edge imaging. In this simple illustration, no CT reconstructions are made. All comparisons are made in the projection images and absolute values are of no interest, only relative differences.

SDNR in the Energy Weighted Projection Image

With superscript t indicating that the pixel location in the projection image corresponds to a target and superscript b indicating background, the signal-difference-to-noise ratio in the projection image of (5) is given by $$SDNR = (\hat{I}(x^b) - \hat{I}(x^t))/\sqrt{\sigma^2(I(x^b)) + \sigma^2(I(x^t))}.$$

Taking the Poisson nature of photon interactions into consideration, i.e. assuming that the counts $I(x'; B_i)$ in each energy bin are Poisson distributed, the SDNR can be written:

$$SDNR = \frac{\sum_{i=1}^{N} (I(x^b; B_i) - I(x^t; B_i))\overline{w}(E_i)}{\sqrt{\sum_{i=1}^{N} (I(x^b; B_i) + I(x^t; B_i))\overline{w}^2(E_i)}}. \quad (16)$$

The weight function $\overline{w}$ is calculated by insertion of (15) in the formula for $\overline{w}$, (6).

SDNR in the k-Edge Decomposed Projection Image

Error propagation is not as straight forward for the decomposed images as for the energy weighted projection images. The expected value of the line integrals $A_\alpha$, $\alpha \in \{ph, Co, k\}$ can be obtained by solving the system of integral equations (8) using the expected value of the counts in each bin from (4) at the left hand side of (8), i.e. setting $m_i(x')=\hat{m}_i(x')$ with $$\hat{m}=(x')=I(x';B_i)=I_0(x')\int_\Phi \Phi(E)\tilde{S}_i(E)D(E)e^{-\int_s \mu(x,y,E)ds}dE. \quad (17)$$

Note that the equation above has been adapted to account for deposited energies by using the substitution $S_i \to \tilde{S}_i$. The set of integral equations constitute a function from $R^N \to R^3$: $A(x')=f(\hat{m}(x'))$, where $\hat{m}(x')$ is the vector of expected counts in each energy bin after passage of the x ray along the path s ending at x' in the projection image and $A(x')$ is the vector of corresponding line integrals $A_\alpha$'s. We estimate the Jacobian $\partial f/\partial \hat{m}$ numerically for $\alpha \in \{ph, Co, k\}$, $i=1, \ldots, N$ using $$\frac{\partial A_\alpha}{\partial \hat{m}_i} \approx \frac{A_\alpha(\hat{m} + e_i \Delta m_i) - A_\alpha(\hat{m})}{\Delta m_i} \quad (18)$$

where $e_i$ is a vector with a 1 at position i and zero otherwise.

The SDNR between a target pixel $x^t$ and the background $x^b$ in the decomposed image can be written as $$SDNR = \frac{A_\alpha(x^t) - A_\alpha(x^b)}{\sqrt{\sigma^2(A_\alpha(x^t)) + \sigma^2(A_\alpha(x^b))}} \quad (19)$$

In calculating the variances $\sigma^2(A_\alpha(x'))$ the Jacobian and the Poisson nature of photon attenuation are used:

$$\sigma^2(A_\alpha(x')) \approx \sum_i \left(\frac{\partial A_\alpha}{\partial \hat{m}_i}\right)^2 \sigma^2(m_i(x')) = \sum_i \left(\frac{\partial A_\alpha}{\partial \hat{m}_i}\right)^2 \hat{m}_i(x') \quad (20)$$

with $\hat{m}(x')$ taken from (17).

Resulting SDNR in Projection Images

In order to evaluate whether the proposed use of the inverse of the energy response function as illustrated in FIG. 3 improves image quality, we compare the signal-difference-to-noise ratios obtained using optimal energy weighting according to (6), after substitution $S_i \to \tilde{S}_i$ using (15). To make the illustration clearer, only bins $B_1$-$B_5$ are used. This is equivalent to reconstructing the image using only counts from bins where the energy information is scrambled due to Compton scattering. The ratios of the SDNRs obtained using optimal weighting and photon counting for the different imaging tasks are given in Table 1. From Table 1 it is clear that the SDNR is improved by approximately 10% using the energy information contained in the Compton scattered events. Bearing in mind that the SDNR is proportional to the

TABLE 1

|  | SDNR(weight)/SDNR(count) |
|---|---|
| Bone | 1.08 |
| Water | 1.12 |
| Fat | 1.13 |

Relative SDNR for different imaging tasks as defined above.

The numerator is the SDNR obtained using optimal energy weighting using the inverse of the detector energy response function and the denominator is obtained using photon counting mode.
square root of the dose, this indicates that using this method can reduce the patient close by 20%. It should however be kept in mind that this evaluation holds for the images constructed using Compton events in the detector, and that they for clinical x-ray spectra used in clinical CT settings constitutes about ⅔ of all counts.

SDNR in Decomposed Images

Figure 4:
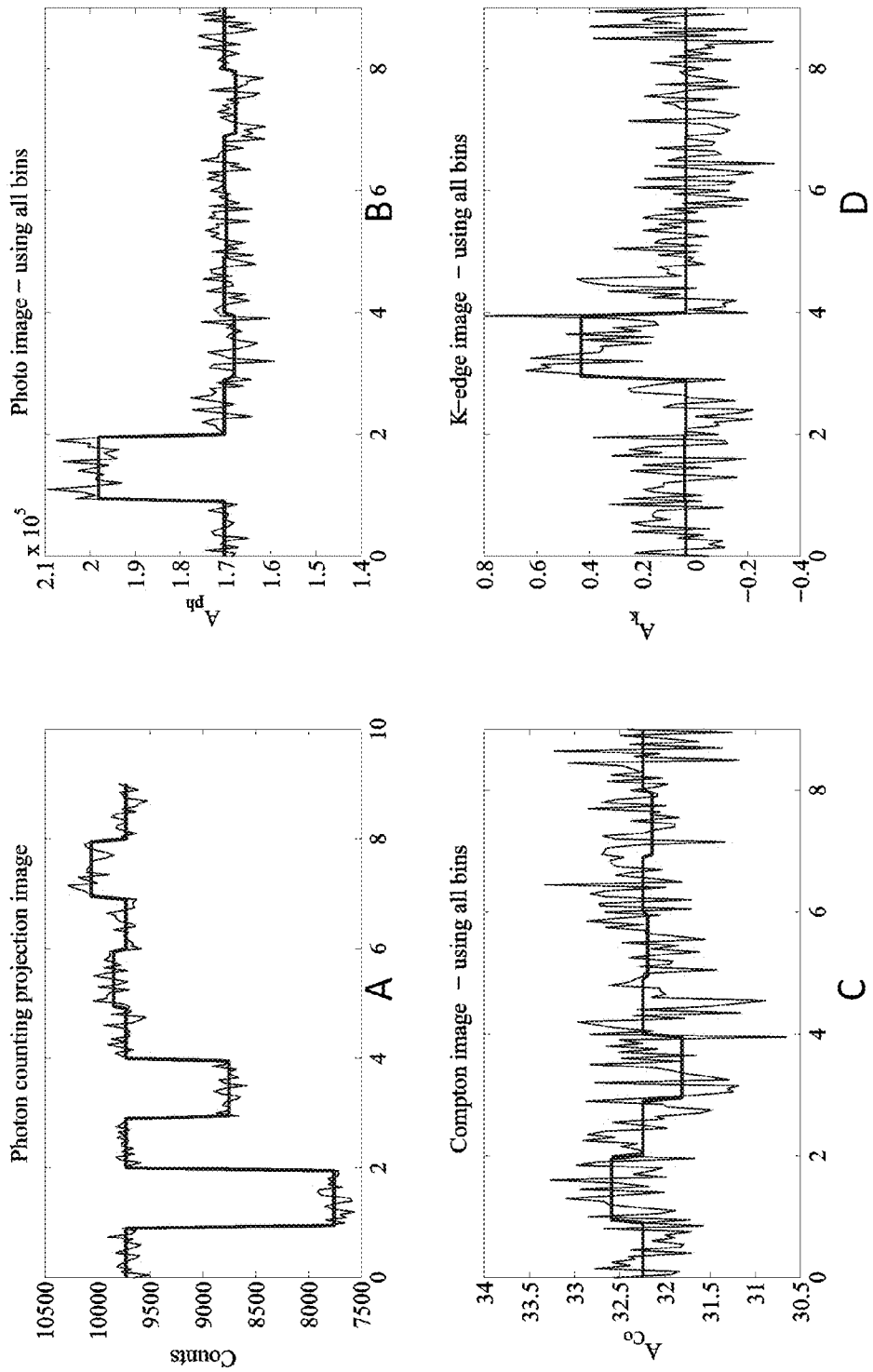
FIG. 4 illustrates the decomposition method originally proposed by Alvarez and Macovski.

In FIG. 4 we show the result of the decomposition method for a 80 kVp spectrum. Panel 4A depicts the defined imaging tasks, from left to right; bone, gadolinium, water and fat. The other sub panels show the result of spectral decompositions, whereby panel 4B depicts the photo-image, panel 4C the Compton-image and panel 4D the k-edge-image. Solid lines depict expected values without influence of statistical noise.

The simulation is done numerically by first estimating the expected counts in each bin according to (17) and then adding Poisson noise to each bin. For illustrative purposes a different set of energy thresholds is used than above; $T_1=5$, $T_2=8$, $T_3=11$, $T_4=19$, $T_5=44$, $T_6=50$, $T_7=57$, $T_8=69$. In the upper left panel of FIG. 4 the photon counting projection image of the three imaging tasks described above is shown. A decomposition into basis images using all eight bins $B_1, \ldots, B_8$ results in the figures in the other panels. In the simulation $I_0=2\times10^7$ is used.

In bins over the threshold $T_4$, i.e. $B_4, \ldots, B_8$, no Compton events deposit energy and the deposited energy is thus equal to the actual energy. However, these photo-electric counts only constitute a fraction of all counts so the increased accuracy would come at the cost of decreased statistics. To evaluate whether the proposed method of using the inverse of the response function will add to the SDNR of the decomposed image, we compare it with the results obtained by using only bins above the Compton threshold $T_4$ when estimating the SDNR according to the method described above. The results are shown in Table 2. For instance, the increase in SDNR of the gadolinium target in the k-edge image is 6% for a 80 kVp spectrum when the proposed method is used compared to only using bins not capturing Compton events. The improvement for other kVp's and the bone imaging task are shown in the Table and with the exception of the bone imaging task in the decomposed photo-image using a 120 kVp-spectrum, it is clear that the proposed method of recouping energy information from Compton scattered events will improve the spectral imaging capabilities of a silicon detector.

TABLE 2

Relative SDNR for different imaging tasks in the decomposed images when using all bins compared to top five bins.

| Image task | kVp | | | | |
|---|---|---|---|---|---|
|  | 80 | 90 | 100 | 110 | 120 |
| Rel. SDNR of Gd in k-edge-image | 1.06 | 1.08 | 1.11 | 1.13 | 1.11 |
| Rel. SDNR of bone in photo-image | 1.12 | 1.09 | 1.06 | 1.03 | 1.00 |

Signal Reset Apparatus for Increased Count Efficiency

Signal Generation

Figure 9:
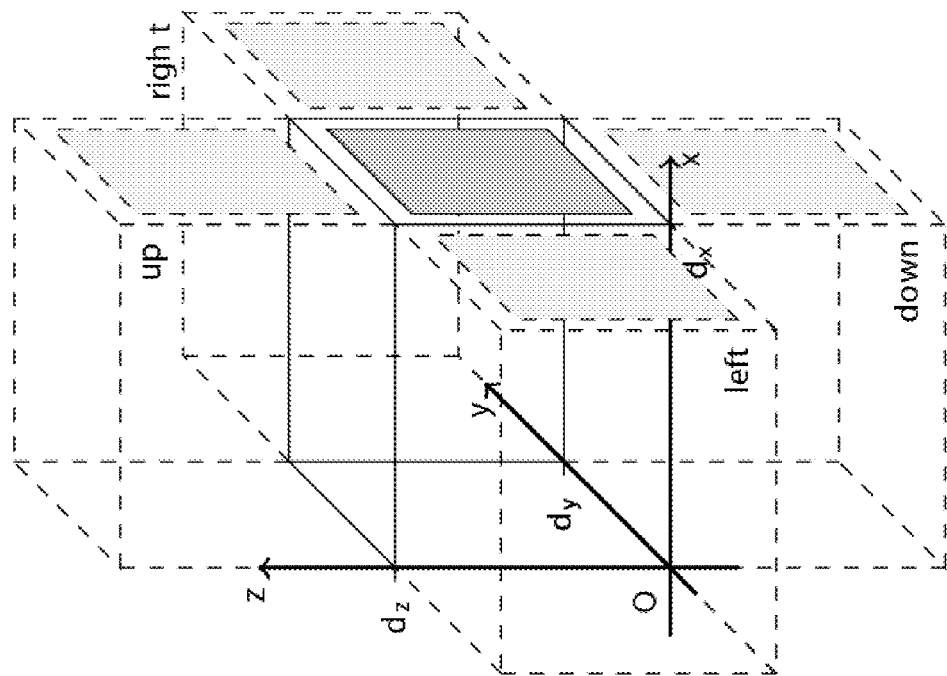
FIG. 9 depicts a schematic view a center segment of pixel in the silicon microstrip detector.

FIG. 9 depicts a schematic view a center segment of pixel in the silicon microstrip detector. The shaded areas at $x=x_d$ are collection electrodes. The entire back side of the strip is covered by another electrode. A bias voltage U is applied over the pixel to collect charges. When charges are collected in neighboring pixels (denoted up, left, right, left) signals will be induced also in the center pixel. This leads to cross talk and a main object of this invention as stated is to make optimal use of these registered counts, since the error in their spatial location is limited to ±1 pixel size for the left and right pixel segment (and also diagonal segments, albeit not shown in this particular embodiment). For the up and down segments, according to the figure, there will be no spatial error.

Following the method for simulating the current signals on the collection electrodes described in M. Brigada et al., "A new Monte Carlo code for full simulation of silicon strip detectors," Nucl. Instrum. Methods Phys. Res., Sect. A vol. 533, pp. 322-343, (2004) the potential $\mathcal{U}$ over the pixel is calculated by solving the Poisson equation $$\nabla^2 \mathcal{U} = -\frac{\rho}{\varepsilon} \tag{21}$$

with boundary conditions $\mathcal{U}=0$ at the collection strip defined by $x=d_x$, 40 µm$<y\leq$360 µm and 40 µm$<z<$1960 µm for a typical pixel segment with $d_2=2$ mm (FIG. 9, electrode size chosen only for illustrative purposes). The second boundary condition is that the entire back side of pixel (x=0) is held at $\mathcal{U}=U$ where U is the applied bias voltage. ρ, the charge density, is given by the net doping concentration of the silicon is $5\times10^{11}$ cm$^{-3}$ multiplied with the elementary charge. The bias voltage is assumed to be 600 V in all illustrations.

The electric field and thus the collection speed and paths of the charge carriers, is given by $\vec{\epsilon}=-\nabla\cdot\mathcal{U}$. According to the Shockley-Ramo theorem the current induced on the electrode is given by $$i(t)=-q_0\vec{v}\cdot\vec{E}_w \tag{22}$$

where $\vec{E}_w$ is minus the gradient of the weighting field W and $q_0$ the carrier charge. The weighting field is obtained by solving Eq. (21) with changed boundary conditions; the electrode for which the signal is calculated is set to unity and all other electrodes have zero potential. The weighting field is also calculated for the neighboring pixel in the negative y-direction, allowing calculation of the induced current on the neighboring electrodes from charges being collected in the center pixel segment (by symmetry in the positive y-direction and z-directions).

Figure 10:
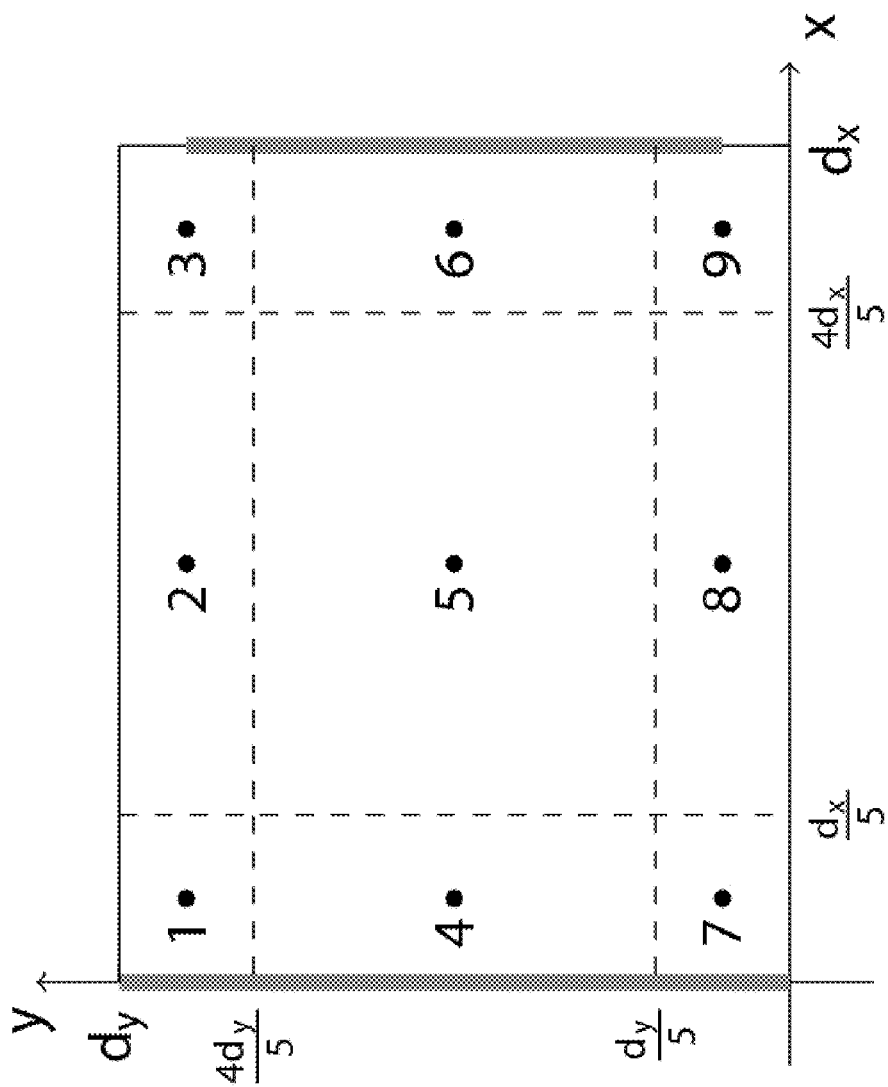
FIG. 10 depicts, for illustration, the locations where charges are assumed to interact for the estimation of the induced currents on the collection electrodes in the pixel in which conversion occurred and also in one of its neighbors.

Signal shape excluding amplitude is to a large extent independent of deposited energy for similar interaction locations. Therefore simulations of current shapes need only be made for representative interaction locations and only for one x-ray energy (60 keV) and the amplitudes can then be scaled with the deposited energy $E_{dep}$, taking event type, charge sharing and multiple scattering into account as described above. FIG. 10 shows the center pixel divided into nine sub pixles (we avoid the word segment since this is used for the segmentation of each pixel in the z-direction). The clot in each rectangle marks the center of the charge cloud for all simulated events occurring inside the rectangle. In the z-direction, the interaction location is in the middle, at $z=d_z/2$.

Figure 11:
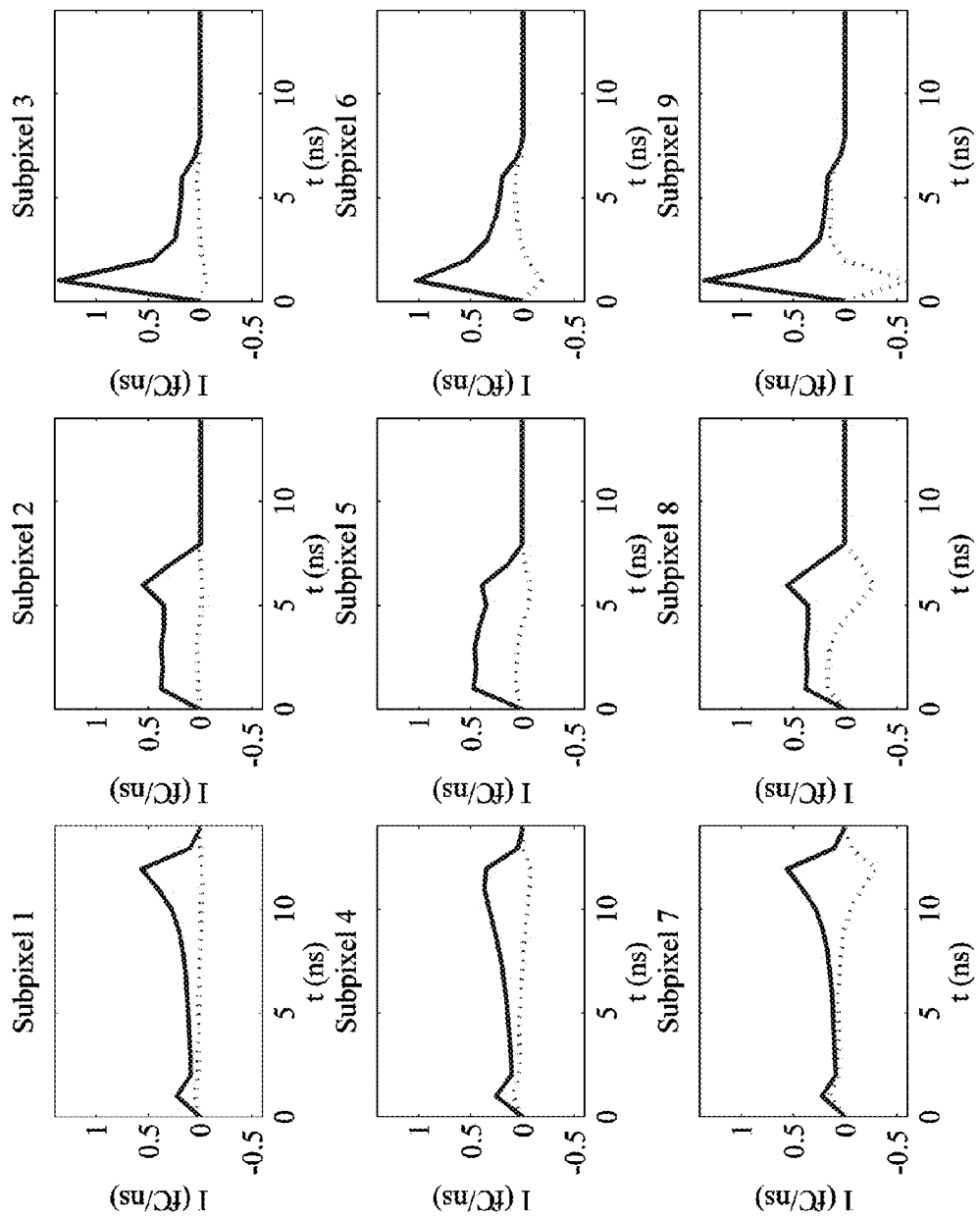
FIG. 11 depicts, for illustration, induced currents in the center pixel (solid line) and neighboring pixel (dotted line) from a photon conversion depositing 60 keV in the locations depicted in FIG. 10.

The simulated currents for the interaction locations shown in FIG. 10 are shown in FIG. 11 for illustration. Induced currents in the center pixel (where the conversion occurred) are shown with a solid line. The clotted line shows the signal induced in the neighboring pixel in the negative y-direction. The assumed bias voltage is 600 V and all pulses are generated under the assumption that all energy from a 60 keV x ray is deposited in a spherical Gaussian charge cloud with a standard deviation (in μm) given by the deposited energy ($E_{dep}$ (in keV): $0.0044 E_{dep}^{1.75}$. Each charge carrier is then allowed to move under the influence of diffusion and the bias field as described by Brigada et al. The total current is given by the sum of the induced currents from each charge carrier.

Reset Mechanism

Figure 5:
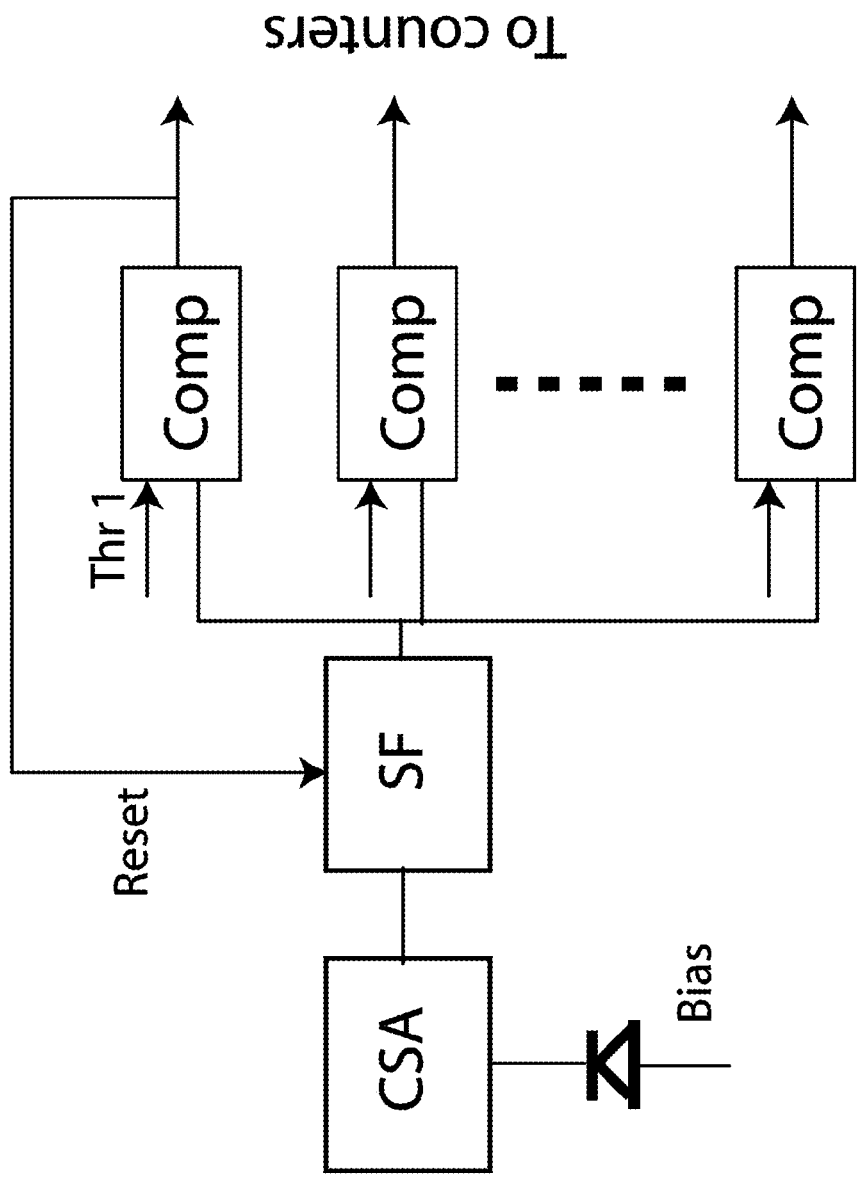
FIG. 5 depicts a block diagram of the read out electronics.

A simplified block diagram of the readout electronics is shown in FIG. 5. It consists of a charge sensitive amplifier (CSA), followed by a shaping filter (SF) and pulse processing. In addition a filter reset function is added. The full linear transfer function of the signal processing chain is given by $$H(s) = \frac{1}{s} \frac{s\tau_0}{1+s\tau_0} \left( \frac{1}{1+s\tau_0} \right)^2 \qquad (23)$$

corresponding to one integrator (the CSA), one differentiator and two integrators, all with time constant $\tau_0$. The time constant $\tau_0$ is programmable in several steps. The choice of $\tau_0$ is a compromise between time resolution and thermal noise level, but also constrained by the duration of the original current pulses, particularly the duration of the induced charge pulse on neighboring strips (FIG. 11). Finally, the output from the SF is compared with a number of preset thresholds in order to classify the pulses into a number of amplitude classes. The amplitude classes define the energy thresholds and thus energy bins used in the spectral imaging framework described above. The higher the number of amplitude classes, the more accurately can the deposited energy of the actual event be determined, which improves image quality.

In order to prevent the relatively long impulse response tail of H to interact with a following event, we introduced a reset function, resetting the filter a time $t_1$ after the detection of an event. In an exemplary embodiment the time $t_1$ is set to $3\tau_0$. The filter is reset through forcing the output and the internal signal nodes of the filter to zero by a short reset pulse. This can for example be accomplished by shorting the capacitors in a Gm-C type of filter. The resulting signal shapes are shown in FIG. 6, with and without the reset function.

Figure 6:
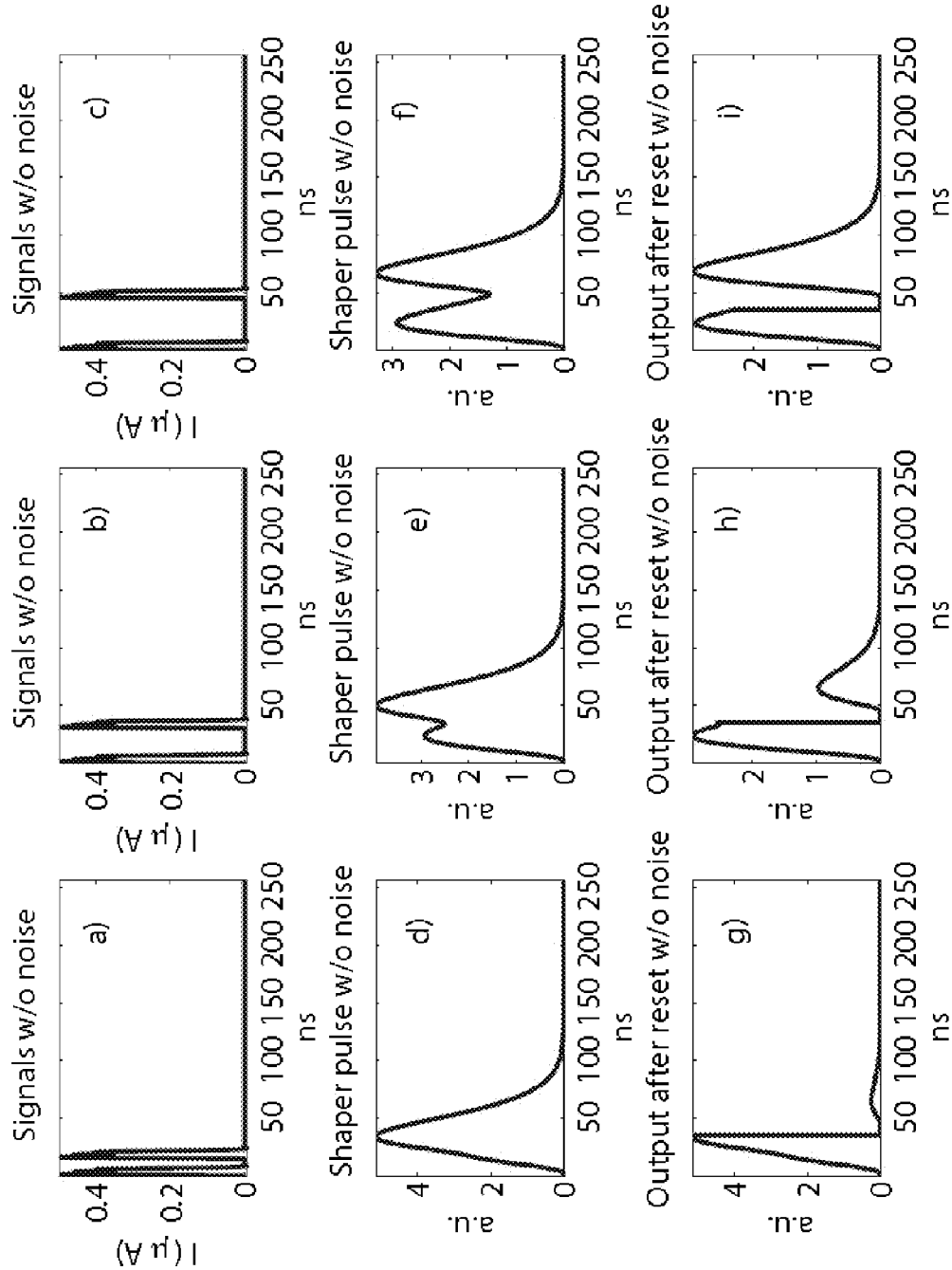
FIG. 6 illustrates the benefit of applying a signal reset to the shaping filter output a certain time after a certain signal threshold has been reached.

FIG. 6 thus depicts the benefit of applying a signal reset to the shaping filter output a certain time $t_1$ after a certain signal threshold has been reached: Top row depicts induced currents with time separation 15, 30 and 45 ns between primary pulses. Middle row depicts shaper output before reset and bottom row the output after reset (the result of the reset mechanism can only be seen on the first pulse). In this exemplary embodiment the filter time constant $\tau_0$ is 10 ns and $t_1=3\tau_0$. The arbitrary units are scaled so that 3 a.u. correspond to 60 keV.

Figure 7:
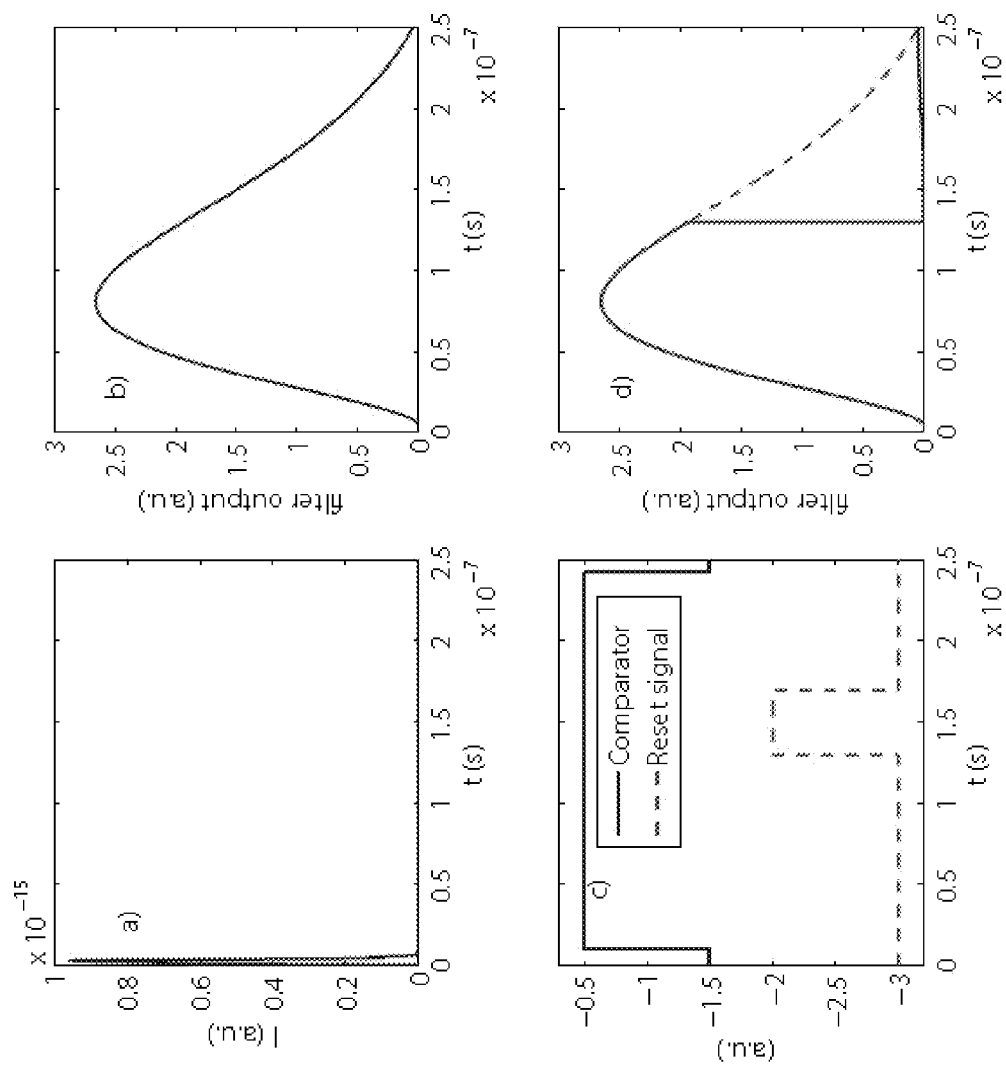
FIG. 7 depicts the principal function of the reset mechanism.

Panels a)-d) of FIG. 7 illustrate the principal function of the reset mechanism, whereby panel 7 a) depicts the original current signal on the electrode, panel 7 b) the output from the shaping filter before application of the reset mechanism (as derived by equation 23), panel 7 c) the times for which comparator 1 registers a value above Thr1 (solid line) and the time when reset function (dashed line) is active to force the output to zero. Finally panel 7 d) depict the shaping filter output with (solid) and without (dashed) the reset mechanism. It is noted how the response tail is shortened by such a described method and this decreases the risk of pile-up and improves energy resolution.

Variable Use of Bins with a High Fraction of Noise Counts in Image Reconstruction We have mentioned three main sources of noise counts in low energy bins; electronic noise, charge shared event and counts induced by charges being collected in neighboring pixels. In order to illustrative the magnitude of counts from charges collected in neighboring pixels relative to primary and other counts, the semi-ideal detector response function, as described by FIG. 1, Equations 10-13 and the sections in which they occur, is first extended to allow for charge sharing, electronic noise and also signal induction from charges being collected in neighboring pixels. By comparing the detected counts in such a model, where primary counts, electronic noise and charge sharing effects are set to zero, an appreciation of the amount of counts induced from charges collected in neighboring pixels can be gained.

Charge Sharing

Some photons will inevitably interact close to the boarder of a neighboring pixel resulting in some charge being collected there. Three factors contribute to the extent of charge sharing. The first is the initial charge cloud shape and size. In addition the cloud will be dispersed by mutual repulsion and subject to thermal diffusion during the collection time. The relative importance of diffusion and repulsion have been investigated in depth for a silicon detector and it was shown that the effect of diffusion dominates over repulsion for reasonable drift distances. Mutual repulsion is therefore excluded from the analysis.

Figure 8:
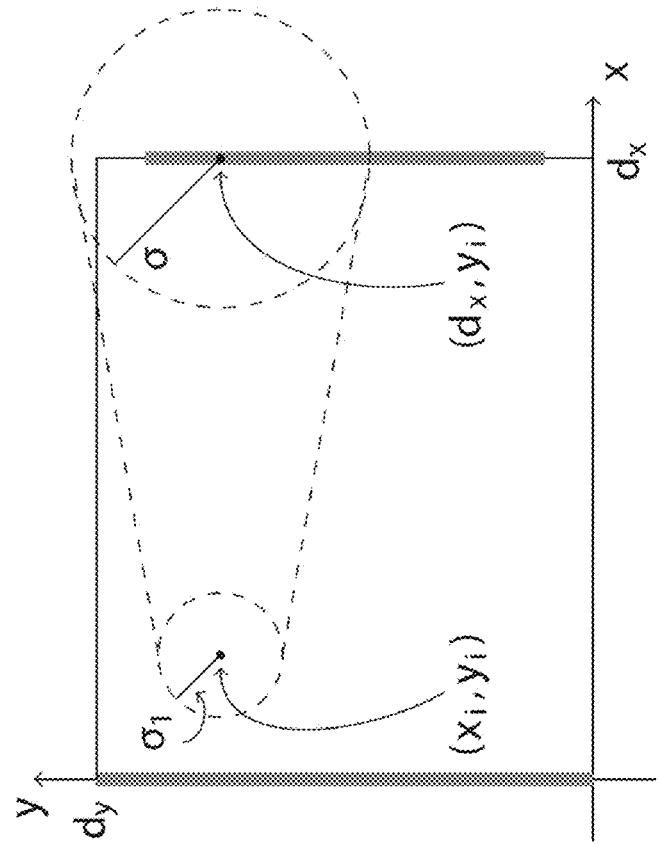
FIG. 8 depicts a model for charge sharing estimation.

FIG. 8 depicts a model for charge sharing estimation. Thick solid lines at $x=0$ and $x=d_x$ depict electrodes. After an initial charge cloud has been generated at $(x_i, y_i)$, holes drift toward the electrode at $x=d_x$. The size of the spherical Gaussian charge cloud is mainly dependent on diffusion and as such a function of the collection time, or equivalently for a given electric field, a function of initial conversion location.

Referring to FIG. 8, let $x_i, y_i, z_i$ be the coordinates of the event occurring at time $t_i$. The initial charge cloud will approximately have a spherical Gaussian shape with a standard deviation dependent on the deposited energy ($E_{dep}$ in keV and $\sigma_1$ in μm):

$$\sigma_1(E_{dep}) = 0.0044 E_{dep}^{1.75}. \qquad (24)$$

During the collection time the charges will diffuse and had they originally been concentrated in one point, their distribution would be Gaussian with a standard deviation of $\sigma_2 = \sqrt{2D(t-t_i)}$ where the diffusion coefficient is given by $D=\mu_h kT/q$ and t is the time. k is the Bolzmann constant, T the temperature and q the carrier charge. The velocity with which the holes will drift toward the collection strip is given by $\vec{v}_h = \mu_h \vec{\epsilon}/(1+\mu_h\epsilon/v_{sat})$ where $\mu_h$ is the hole mobility, $\vec{\epsilon}$ the electric field and $v_{sat}$ the saturation velocity $7 \cdot 10^6$ cm/s. To a good approximation, the electric potential depends only on x and the electric field is almost constant. At time t, just before the collection, the resulting Gaussian distribution of charges can therefore be assumed to be centered at $(x_i+v_h(t-t_i), y_i, z_i)$ and have a standard deviation of $$\sigma = \sqrt{\sigma_1^2 + \sigma_2^2} \quad (25)$$

The maximum charge cloud spread in the y-direction will be when the center of the charge cloud has reached the collection strip at $x=d_x$. For an interaction at $(x_i, y_i, z_i)$, this will happen at $t=t_i+(d_x-x_i)/v_h$ which allows estimation of $\sigma_2$ and thus $\sigma$ from Eq. (25). The fraction that does not leak to neighboring pixels for an interaction depositing energy $E_{dep}$ at $(x_i, y_i, z_i)$ during the charge collection time is given by $$\int_{abs}(x_i, y_i, z_i) = \frac{1}{\sigma^3 (2\pi)^{3/2}} \int_{-\infty}^{\infty} \int_0^{d_y} \int_0^{d_z} e^{-\frac{(x-d_x)^2+(y-y_i)^2+(z-z_i)^2}{2\sigma^2}} dx\,dy\,dz. \quad (26)$$

Note that Eq. (26) assumes that charge can only be lost in the y- and z-directions. This approximation is motivated by the collection electrodes covering the entire pixel backside for $x=0$ and 320 μm in y-direction for $x=x_d$.

Electronic Noise

A typical amplitude of electronic noise is 300 e⁻ rms ENC (root mean square of the equivalent noise charge) at the shaping filter. To create 300 e⁻-h-pairs, 300×3.6 eV=1.08 keV are needed. In terms of the arbitrary units (denoted a.u.) of FIG. 6, where the charge deposited by a 60 keV x ray corresponds to 3 units, 1.08 keV correspond to an output amplitude of 3×1.08/60=0.054. This an ENC of 300 corresponds to 0.054 a.u.

FIG. 5 depicts a block diagram of the read out electronics, including a charge sensitive amplifier (CSA), a shaping filter (SF) a plurality of comparators (Comp), each with a separate threshold of which the threshold for the first comparator is denoted Thr1. The figure also depicts the reset mechanism, whereby the output of the shaping filter is set to zero a certain time after the signal output has reached Thr1. If white noise currents with different rms are fed through the simulated electronics chain of FIG. 5, the resulting rms of the output pulse heights can be evaluated. The result of such simulations allows determination of the current rms that results in a certain rms at the comparator. A typical value is 0.065 μA. White noise of this amplitude (rms) is added to all simulated currents.

Simulation of Counts Induced from Charges Collected in Neighboring Pixels

To estimate the fraction of counts induced from charges collected in neighboring pixels, we perform a large scale Monte Carlo simulation for a pixel segment in the center of the detector. For the center pixel, we therefore let x rays with known energy $E_{act}$ fall onto the detector according to a uniform distribution over the pixel area. The time between successive events is assumed to be exponentially distributed with a mean corresponding to the flux rate. For the neighboring pixels and pixel segments; denoted up, down, left and right in FIG. 9; the same flux rate and exponentially distributed time between events are assumed, but instead of assuming a known energy $E_{act}$, the energies are drawn from a clinically realistic input spectrum (FIG. 2).

All currents generated on the center pixel collection electrode are modeled and, after the addition of electronic noise, fed through a model of the read-out electronics and the detected pulse height is recorded. This modeled pulse height will then encompass the effect of charge sharing, cross-talk, electronic noise and pile-up on the energy resolution.

Below an overview of the model is given:

1. Select a clinically relevant x-ray spectrum and photon flux η converting in a pixel segment (converted photons/(s·segment).
2. For the center pixel, select a photon energy $E_{act}$ for which the energy resolution should be determined.
3. Draw a high number (N=50 000) of photons with energy $E_{act}$ and random interaction locations $(x_i, y_i, z_i)$ and interaction times $t_i$, i=1, ..., N. $t_i$'s are drawn from an exponential distribution with mean 1/ηs.
4. Evaluate how much charge is deposited by event i not taking charge sharing effects into consideration.
5. Estimate charge sharing effects by allocating deposited charge from event i in center pixel and neighboring pixel dependent on $(x_i, y_i, z_i)$ according to assumptions on charge sharing mechanisms.
6. Use the Shockley-Ramo theorem to estimate the current induced on electrode in center pixel from charge deposited in center pixel by event i in center pixel.
7. Use the Shockley-Ramo theorem to estimate the current induced on electrode in center pixel from charge deposited in neighboring pixels (charge sharing) by event i in center pixel.
8. Use Shockley-Ramo theorem to estimate the induced currents from scatter events.
9. For each neighboring pixel and pixel segment (four neighbors in total, two in y-direction and two in z-direction, FIG. 9), randomly select N photon energies from the spectrum of deposited energies, N uniform random interaction locations $(x_j, y_j, z_j)$ over the pixel area and N interaction times $t_j$. Sort the 4N neighboring events by their respective $t_j$.
10. Estimate effects of charge sharing on deposited charge in neighboring pixel and center pixel from event j in neighboring pixel.
11. Use the Shockley-Ramo theorem to estimate the current induced in center pixel electrode from charge deposited in neighboring pixel.
12. Use the Shockley-Ramo theorem to estimate the current induced in center pixel electrode from charge carriers charge shared from neighboring pixel to center pixel.
13. Sort all induced current pulses on the center electrode by time and superposition contributions where appropriate.
14. Add an estimate of stationary white electronic noise to the entire current pulse train.
15. Feed current pulse train through a model of the read-out electronics and record pulse heights in center pixel.

Magnitude of Counts Induced from Charges Collected in Neighboring Pixels

In Table 3 the fraction of all detected counts pertaining to signal induction from neighboring pixels are given. This is obtained by setting the electronic noise, σ of Eq. (25) and the energy of the primary x-rays to zero in the above described model. The values are given in percent of total counts (assuming primary x-rays with energy 70 keV, in the middle of the energy range for typical medical x-ray spectra for CT). Total counts encompass primary counts, charge sharing, counts induced from charges collected in neighboring pixels and electronic noise.

TABLE 3

Signal induction from neighboring pixels as a percentage of total counts.

| | U | | | | | | | | | |
|---|---|---|---|---|---|---|---|---|---|---|
| | 600 V | | | | | 1000 V | | | | |
| $\tau_0$(ns) | 5 | 10 | 20 | 30 | 40 | 5 | 10 | 20 | 30 | 40 |
| $T_1$ = 3 keV | 28 | 32 | 14 | 8.2 | 5.9 | 27 | 26 | 8.4 | 3.7 | 1.9 |
| $T_1$ = 5 keV | 32 | 19 | 4.8 | 0.8 | 0.3 | 30 | 9.4 | 1.3 | 0.1 | 0.0 |

Table 3 should be interpreted the following way: if a bias voltage of 600 V is applied, a time filter constant $\tau_0$=30 ns and a lower threshold $T_1$=3 keV (Thr1 in FIG. 5), the fraction of all counts that pertain to counts induced from charges collected in neighboring pixels is 8.2% and for $T_1$=5 keV 0.8%. Obviously counts induced from charges collected in neighboring pixels corresponding to 8.2−0.8=7.4 percentage units of all counts would fall in an energy bin defined by the upper and lower thresholds 3 and 5 keV. Assuming that electronic noise is well rejected by a threshold of 3 keV (for illustrative purposes but reasonable given the knowledge that 300 e⁻ equivalent noise charge for the electronic noise corresponds to 1.08 keV) no electronic noise is captured in bin with edges 3 and 5 keV. From the semi-ideal energy response function described by FIG. 1, Equations 10-13 and the sections in which they occur, the fraction of primary counts falling in such a bin defined by thresholds 3 and 5 keV can be evaluated. This fraction is 9%. This indicates that almost 50% ($\approx$7.4/(7.4+9)) of all counts in such bin would be the result of counts induced from charges collected in neighboring pixels.

The thresholds at 3 and 5 keV were chosen only for illustrative purposes. For other choices of threshold sets in the energy range where counts induced from charges collected in neighboring pixels are the dominant source of noise, the same principle apply albeit the fraction of counts induced from charges collected in neighboring pixels in such bins will differ from $\approx$50%.

This illustrates that it is possible to select one or a plurality of energy bins in the lower part of the spectrum that deliberately have a high fraction of noise counts, but where these noise counts pertain to induced signals from charges collected in neighboring pixels and thus have a spatial of maximally ±1 pixel.

Use of Counts Induced from Charges Collected in Neighboring Pixels

Depending on what target is being imaged, or, equivalently, which part of a reconstructed image that is examined, it is beneficial from an image quality point of view to treat the information contained in the above described energy bins with a high fraction of counts induced from charges collected in neighboring pixels differently. For small object with a high contrast the spatial resolution degradation obtained by using such bins (where a high fraction of counts are offset ±1 pixel in random directions as compared to the coordinate of the true conversion) will not be offset by the gain in signal-to-noise ratio. However, for larger object with small contrast, the signal-to-noise ratio improvement achievable by using also the low bins with a high fraction of counts induced from charges collected in neighboring pixels will most probably outweigh the loss in high frequency spatial resolution. The same argument holds for charge shared events, i.e. event where electron-hole-pairs diffuse over the boundary of one pixel and are detected in the neighboring pixel.

Therefore we propose the use of an image reconstruction algorithm that allows a choice of using the low bins with a high fraction of counts induced from charges collected in neighboring pixels and charge shared events, or not to use them, depending on the specific target being examined. This adjustment can be made manually, by means of button to push or a specific program selected, and should also allow easy switching between the two reconstruction modes.

The selection of which energy bins to use by the reconstruction algorithm can also be made automatically, for instance, but not limited to, either by means of automated analysis of the spatial frequency content of the whole or part of image plane being reconstructed (which, in such a case, could first be reconstructed using energy bins where counts induced from charges collected in neighboring pixels are known not be detrimental to the spatial resolution of the image), or by means of incorporating the choice of image reconstruction algorithm into the choice of pre-set image task on the imaging modality, of which computed tomography is a major foreseen application.

In conclusion the following can be said about the above proposed methods:

Silicon, and any other low-Z direct conversion detector material, suffers from a high fraction of Compton interactions in the semi-conductor material. This offsets one of the benefits of using photon counting detectors; the possibility to determine the original x-ray quantum energy which in turn allows enhanced image quality using the spectral imaging framework described above. It is therefore imperative that the little energy information that is left, contained in the Compton edges, is put to maximal use. From the above Tables 1 and 2 it is clear that using the energy information with the proposed method has the potential to increase SDNR at any given dose, or lower patient dose at a given image quality. The magnitude of the improvement is medically relevant since it corresponds to a dose reduction of ~20% for any given image quality. We have also shown that when performing spectral decomposition of images obtained using low Z (atomic number) detector materials, it is beneficial to use the inverse of the (simulated or otherwise obtained) response function applied to low energy bins to recoup some of the energy information that is lost due to Compton interactions. This shows that while a large fraction of Compton events in the detector certainly degrades the energy resolution, all spectral information is not lost.

The benefit of using the novel method for resetting the shaping filter Output is most readily seen by inspection in FIG. 6. In panels 6 d)-6 f), it is seen that only one count is registered in the absence of a reset mechanism, whereas both pulses are detected in panes 6 g)-6 i), albeit with distorted pulse heights. At first glance the distorted pulse heights appear be highly detrimental to the image quality if an energy weighting scheme as described above is used (with a weight factor that it close to proportional to $E^{-3}$, a fourfold reduction in measured pulse height corresponds to a weight factor 64 times larger. However, those events that erroneously get assigned a relatively low pulse height (the second pulse peak in panels g) and h)), where the distortion would be the gravest if weighted according to $E^{-3}$, are highly likely to be assigned a lower energy bin where counts predominantly come from Compton events. As we have shown, with the application of the inverse of the detector response function, such counts will be statistically assigned a (distribution) of higher energies (corresponding to their probable original quantum energy) before the weight factor is applied. The illustrated increased count efficiency of the proposed reset mechanism is thus alone a sufficient illustration that image quality will benefit from application of such a reset filter.

The automatic or manual selection of whether low energy bins with a high fraction of noise counts should be included in the image reconstruction algorithm will allow the observer of the image to make a tradeoff between high spatial and high contrast resolution. This is beneficial if targets with different spatial frequency characteristics are imaged.

From the foregoing description, it will thus be evident that the present invention provides a design improved spectral imaging capabilities for photon counting silicon x-ray detectors. As various changes can be made in the above embodiments and operating methods without departing from the spirit or scope of the following claims, it is intended that all matter contained in the above description or shown in the accompanying drawings should be interpreted as illustrative and not in a limiting sense.

Variations or modifications to the design and construction of this invention, within the scope of the appended claims, may occur to those skilled in the art upon reviewing the disclosure herein. Such variations or modifications, if within the spirit of this invention, are intended to be encompassed within the scope of any claims to patent protection issuing upon this invention.

What is claimed is:

1. A method for extracting energy information from Compton events in a photon counting detector, said method comprising the steps of:
   allocating events according to their detected energy based on a plurality of energy thresholds, wherein said thresholds define a plurality of energy bins, and each energy bin has an associated energy bin function;
   inverting a detector response function of said photon counting detector; and
   integrating energy bin functions with the inverted detector response function to obtain a distribution of original x-ray quantum energies of events detected in each energy bin.

2. The method of claim 1, wherein the distribution of original quantum energies is used to adapt the spectral imaging framework.

3. The method of claim 1, wherein said detector is used in medical imaging applications.

4. The method of claim 1, wherein said detector is used in non-destructive testing.

5. The method of claim 1, wherein said detector energy response function is mathematically simulated.

6. The method of claim 1, wherein said detector energy response function is measured using monochromatic x-rays.

7. The method of claim 1, wherein said photon counting detector is a silicon detector.

8. An apparatus for extracting energy information from Compton events in a photon counting detector, said apparatus comprising:
   means for allocating events according to their detected energy based on a plurality of energy thresholds, wherein said thresholds define a plurality of energy bins, and each energy bin has an associated energy bin function;
   means for inverting a detector response function of said photon counting detector; and
   means for integrating energy bin functions with the inverted detector response function to obtain a distribution of original x-ray quantum energies of events detected in each energy bin.

9. The apparatus of claim 8, further comprising means for adapting a spectral imaging framework based on the distribution of original quantum energies.

10. The apparatus of claim 9, wherein said photon counting detector is a silicon detector.

11. A method for image reconstruction based on energy information from a photon counting detector, wherein said method includes selecting between two different image reconstruction triodes: i) a first image reconstruction mode in which low energy bins with a high fraction of noise counts are included in the image reconstruction; and ii) a second image reconstruction mode in which low energy bins with a high fraction of noise counts are excluded in the image reconstruction.

12. The method of claim 11, wherein said noise counts are counts from electronic noise.

13. The method of claim 11, wherein said noise counts are counts induced from charges collected in neighboring pixels of the detector.

14. The method of claim 11, wherein said noise counts are counts from charge shared events in neighboring pixels of the detector.

15. The method of claim 11, wherein image reconstruction mode is selected in dependence on the imaging task.

16. The method of claim 11, wherein said first image reconstruction mode is selected for improved signal-to-noise-ratio, and said second image reconstruction mode is selected for improved spatial resolution.

17. The method of claim 11, wherein said second image reconstruction mode is selected for reconstruction of image details that demand high spatial resolution.

18. An apparatus for image reconstruction based on energy information from a photon counting detector, wherein said apparatus is configured for operation based on two different image reconstruction modes: i) a first image reconstruction mode in which low energy bins with a high fraction of noise counts are included in the image reconstruction; and ii) a second image reconstruction mode in which low energy bins with a high fraction of noise counts are excluded in the image reconstruction.

19. The apparatus of claim 18, wherein said noise counts are counts from electronic noise.

20. The apparatus of claim 18, wherein said noise counts are counts induced from charges collected in neighboring pixels of the detector.

21. The apparatus of claim 18, wherein said noise counts are counts from charge shared events in neighboring pixels of the detector.

22. The apparatus of claim 18, wherein said apparatus is configured to allow selection between said image reconstruction modes.

23. The apparatus of claim 18, wherein said apparatus is configured to automatically select between said image reconstruction modes.

24. The apparatus of claim 23, wherein said apparatus is configured to select between said image reconstruction modes based on automated analysis of the spatial frequency content of at least part of the image plane being reconstructed.

25. The apparatus of claim 23, wherein said apparatus is configured to incorporate the selection of image reconstruction mode into the selection of imaging task on the imaging modality.

* * * * *

UNITED STATES PATENT AND TRADEMARK OFFICE
CERTIFICATE OF CORRECTION

PATENT NO. : 8,378,310 B2
APPLICATION NO. : 12/707076
DATED : February 19, 2013
INVENTOR(S) : Bornefalk et al.

It is certified that error appears in the above-identified patent and that said Letters Patent is hereby corrected as shown below:

In the Claims:

In column 24, line 9, claim 11 delete "reconstruction triodes" and insert --reconstruction modes--.

Signed and Sealed this
Twenty-seventh Day of August, 2013

Teresa Stanek Rea
*Acting Director of the United States Patent and Trademark Office*